US010572650B2

(12) United States Patent
Cooper et al.

(10) Patent No.: US 10,572,650 B2
(45) Date of Patent: Feb. 25, 2020

(54) TECHNOLOGIES FOR INDEPENDENT SERVICE LEVEL AGREEMENT MONITORING

(71) Applicant: Intel Corporation, Santa Clara, CA (US)

(72) Inventors: Trevor Cooper, Portland, OR (US); Kapil Sood, Beaverton, OR (US); Scott P. Dubal, Beaverton, OR (US); Michael Hingston McLaughlin Bursell, Halstead (GB); Jesse C. Brandeburg, Portland, OR (US); Stephen T. Palermo, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 507 days.

(21) Appl. No.: 15/056,570

(22) Filed: Feb. 29, 2016

(65) Prior Publication Data

US 2017/0250892 A1 Aug. 31, 2017

(51) Int. Cl.

| | |
|---|---|
| ***H04L 12/24*** | (2006.01) |
| ***G06F 3/06*** | (2006.01) |
| ***G06Q 30/06*** | (2012.01) |
| ***G06F 21/44*** | (2013.01) |

(52) U.S. Cl.
CPC .................................. *G06F 21/44* (2013.01)

(58) Field of Classification Search
CPC ...... H04L 43/50; H04L 43/0876; G06F 21/44
See application file for complete search history.

(56) References Cited

U.S. PATENT DOCUMENTS

2010/0088150 A1* 4/2010 Mazhar ................ G06F 9/5088 717/120
2012/0159176 A1* 6/2012 Ravindran ........... H04L 63/104 713/176
2014/0279201 A1* 9/2014 Iyoob ................ G06Q 30/0631 705/26.7
2015/0113142 A1* 4/2015 Adolph .................. H04L 47/70 709/226
2015/0163121 A1* 6/2015 Mahaffey ............ G06F 11/0766 707/687
2015/0326448 A1* 11/2015 Chaudhary ........... G06Q 20/14 705/40

(Continued)

*Primary Examiner* — Kevin T Bates
*Assistant Examiner* — Mark A Scott
(74) *Attorney, Agent, or Firm* — Barnes & Thornburg LLP

(57) ABSTRACT

Technologies for monitoring service level agreement (SLA) performance in an end-to-end SLA monitoring architecture include a network functions virtualization (NFV) SLA controller configured to manage SLA agents initialized in various network processing components of the end-to-end SLA monitoring architecture. To do so, the NFV SLA controller is configured to provide instruction to the SLA agents indicating which types of telemetry data to monitor and receive the requested telemetry data, as securely collected and securely packaged by the SLA agents. The NFV SLA controller is further configured to securely analyze the received telemetry data to determine one or more performance metrics and compare performance benchmarks against the performance metrics to generate an SLA report that includes the results of the comparison. Other embodiments are described and claimed.

25 Claims, 8 Drawing Sheets

(56) References Cited

U.S. PATENT DOCUMENTS

| | | | | |
|---|---|---|---|---|
| 2015/0326535 | A1* | 11/2015 | Rao | H04L 41/5054<br>726/15 |
| 2016/0062746 | A1* | 3/2016 | Chiosi | G06F 8/35<br>717/104 |
| 2016/0156527 | A1* | 6/2016 | Ha | H04L 41/5009<br>709/202 |
| 2016/0226913 | A1* | 8/2016 | Sood | H04L 63/20 |
| 2016/0337175 | A1* | 11/2016 | Rao | H04L 41/0803 |
| 2016/0364269 | A1* | 12/2016 | Wang | G06F 3/0604 |
| 2016/0379000 | A1* | 12/2016 | Carpenter | G06F 21/552<br>726/17 |
| 2017/0031600 | A1* | 2/2017 | Kesavan | G06F 3/0605 |
| 2017/0041201 | A1* | 2/2017 | Ilyadis | H04L 43/08 |
| 2017/0180391 | A1* | 6/2017 | Hinchliffe | G06F 8/65 |

* cited by examiner

TECHNOLOGIES FOR INDEPENDENT SERVICE LEVEL AGREEMENT MONITORING

BACKGROUND

Network operators and service providers typically rely on various network virtualization technologies to manage complex, large-scale computing environments, such as high-performance computing (HPC) and cloud computing environments. For example, network operators and service provider networks may rely on network function virtualization (NFV) deployments to deploy network services (e.g., firewall services, network address translation (NAT) services, deep packet inspection (DPI) services, evolved packet core (EPC) services, mobility management entity (MME) services, packet data network gateway (PGW) services, serving gateway (SGW) services, billing services, transmission control protocol (TCP) optimization services, etc.). Such NFV deployments typically use an NFV infrastructure to orchestrate various virtual machines (VMs) to perform virtualized network services, commonly referred to as virtualized network functions (VNFs), on network traffic and to manage the network traffic across the various VMs. Unlike traditional, non-virtualized deployments, virtualized deployments decouple network functions from underlying hardware, which results in network functions and services that are highly dynamic and generally capable of being executed on off-the-shelf servers with general purpose processors. As such, the VNFs can be scaled-in/out as necessary based on particular functions or network services to be performed on the network traffic.

NFV deployments typically require active monitoring of the network traffic to measure the performance of the network (e.g., by measuring critical parameters for network traffic). Such performance monitoring is generally based on terms disclosed in a service-level agreement (SLA) (i.e., a contract between a service provider and its internal or external customers that documents which services the provider will furnish). Oftentimes, the SLA monitoring capabilities require being designed into individual platforms of the NFV architecture, as well as the overall NFV architecture. However, the performance metrics need to be verifiable, which can be particularly challenging in multitenant environments (e.g., in virtualized platforms running multiple end-user applications or tenant network services).

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
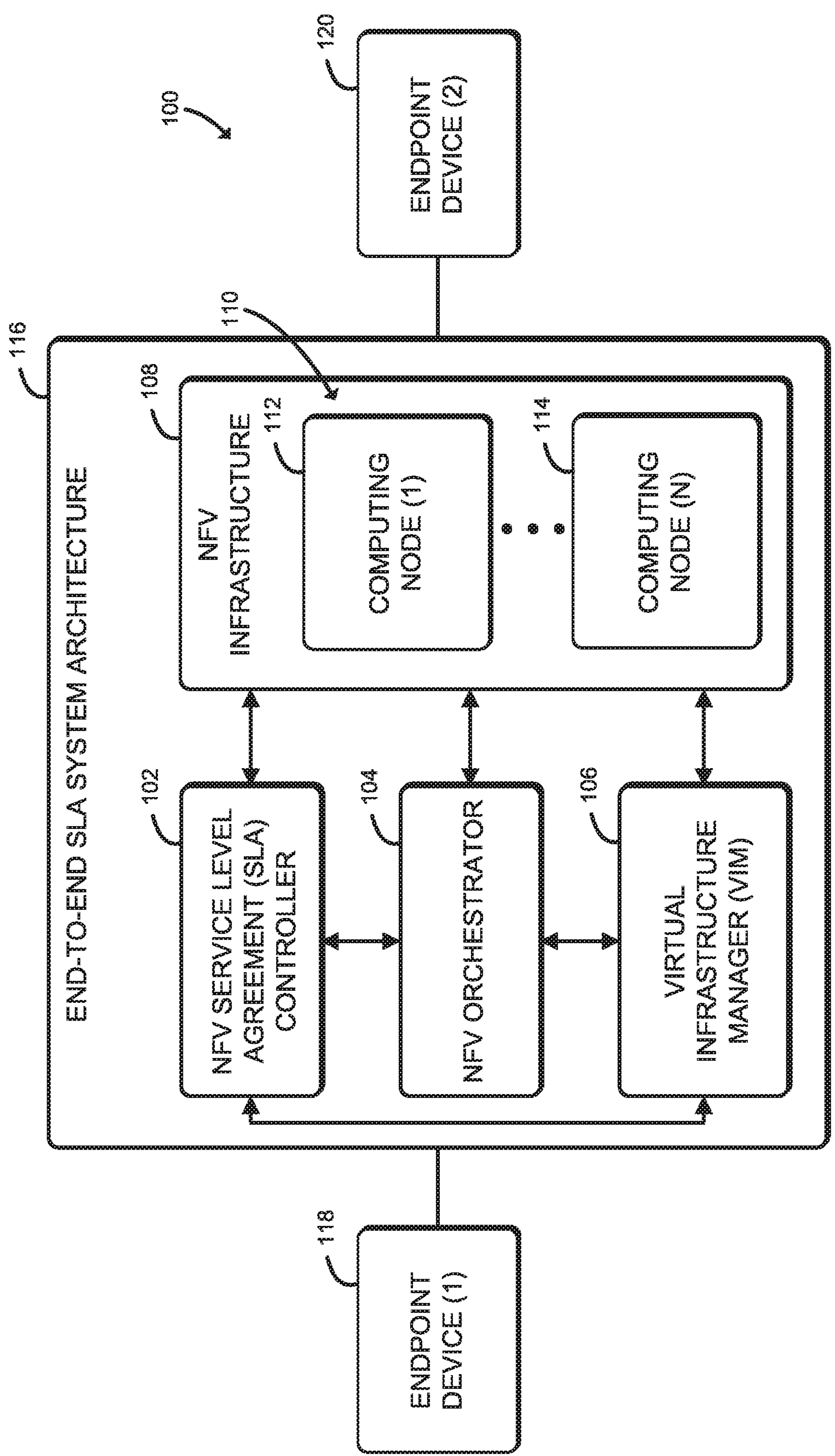
FIG. 1 is a simplified block diagram of at least one embodiment of a system for monitoring service level agreement (SLA) performance of an end-to-end SLA monitoring architecture that includes an NFV SLA controller and one or more computing nodes.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for monitoring service level agreement (SLA) performance in a network function virtualization (NFV) architecture that includes an NFV SLA controller 102 and various network processing components of an end-to-end SLA monitoring architecture 116. The network processing components include an NFV orchestrator 104, a virtual infrastructure manager (VIM) 106, and an NFV infrastructure 108 that includes one or more computing nodes 110, as well as other network processing components described in FIG. 4 below (see, e.g., the VNF manager 414 of FIG. 4). In use, the network processing components of the end-to-end SLA monitoring architecture 116 are configured to monitor the processing of network communications between an endpoint device 118 and another endpoint device 120, as well as any software and/or hardware characteristics associated with the processing of the network communications. It should be appreciated that, in some embodiments, the end-to-end SLA monitoring architecture 116 may include additional and/or alternative network processing components (physical and/or virtual) to perform the functions described herein. It should be further appreciated that, in some embodiments, the end-to-end SLA monitoring architecture 116 may support multi-tenancy (i.e., multiple tenants, or customers).

Figure 4:
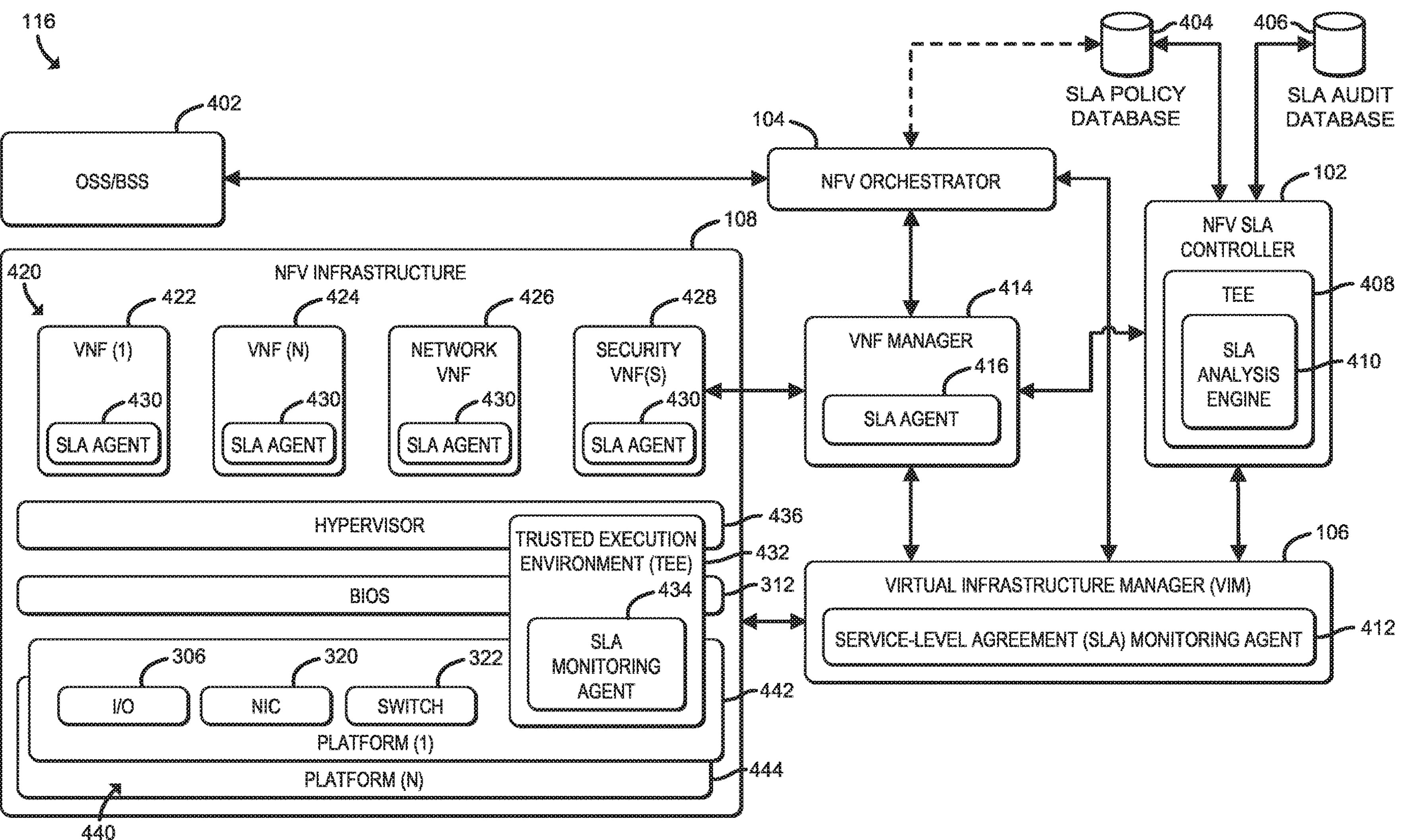
FIG. 4 is a simplified block diagram of at least one embodiment of the end-to-end SLA monitoring architecture of FIG. 1.

To monitor the processing of network communications, the end-to-end SLA monitoring architecture 116 includes a number of SLA monitoring components, including the NFV SLA controller 102 and a number of SLA monitoring agents, also referred to as SLA agents herein, (see, e.g., the SLA agents 430 of FIG. 4). The NFV SLA controller 102 is configured to instantiate and manage the various SLA monitoring agents of the end-to-end SLA monitoring architecture 116. The SLA monitoring agents are configured to run inside the various compute, network, and storage subsystems (e.g., the network processing components) of the end-to-end SLA monitoring architecture 116. Accordingly, it should be appreciated that different SLA monitoring agents may be configured to collect different types of telemetry data. Further, unlike traditional technologies relying on software agents running on a central processing unit (CPU) of the respective component, which can be unreliable and introduce security concerns (e.g., malicious interference), the SLA monitoring agents are configured to run inside a trusted execution environment (TEE) of the respective component in which they have been deployed.

In use, the SLA monitoring agents perform active and/or passive monitoring of telemetry data at the various network processing components, as directed by the NFV SLA controller 102. To do so, as described further below, the SLA monitoring agents are configured to securely collect telemetry data based on an SLA policy managed by the NFV SLA controller 102. Upon collecting the telemetry data, the SLA monitoring agents are further configured to securely package and transmit the telemetry data to the NFV SLA controller 102 for analysis.

The telemetry data collected by each of the SLA monitoring agents may include any type of data on which analysis of the end-to-end SLA monitoring architecture 116 can be performed. For example, the telemetry data may include information relative to the network traffic processed at a particular network processing component on which the SLA monitoring agent resides, such as network packet behavior information including round-trip-times, jitter information, throughput information, latency information, packet loss information, etc. The telemetry data may additionally or alternatively include component-level configuration, operation, and/or policy data respective of the network processing component. For example, the telemetry data may include quality of service (QoS) metrics for memory, QoS metrics for cache, NIC/switch queue metrics (e.g., queue utilization metrics), platform reliability metrics, etc.

As described in further detail below, the NFV SLA controller 102 is additionally configured to analyze the telemetry data received from the SLA monitoring agents, determine one or more performance metrics based on the analysis, and compare the one or more performance metrics against a performance policy outlined in an SLA. The SLA may be embodied as, or otherwise defined by, a contract between a service provider and the service provider's internal and/or external customers that documents which services the provider will furnish and particular aspects of those services (e.g., scope of service, quality of service, responsibilities, etc.), which has been agreed upon by the service provider and the service provider's corresponding customer (s). The performance metrics may include any data or measurements usable to identify performance levels (e.g., measureable characteristics) of the end-to-end SLA monitoring architecture 116 (i.e., of the network processing components corresponding to the telemetry data the SLA monitoring agents are configured to collect), such as quality of service levels, application response time, usage statistics, resource utilization metric, etc., as may be determined from the SLA.

For example, the SLA may indicate a required availability and uptime (e.g., a percentage of the time services are to be available), a minimum/maximum number of concurrent users that can be served, an expected performance level, etc., such that SLA monitoring policies may be derived therefrom. Accordingly, an SLA monitoring policy (e.g., based on an SLA for which the end-to-end SLA monitoring architecture 116 was deployed) may be generated or received that includes various rules, such as SLA monitoring policies usable to execute SLA monitoring functions, secure communication path policies usable to establish secure communication channels, configuration parameters usable to instantiate and configure the SLA monitoring components, and function descriptors to indicate to the SLA monitoring components throughout the end-to-end SLA monitoring architecture 116 (see, e.g., the SLA monitoring agents of FIG. 4) which telemetry data to monitor. The NFV SLA controller 102 is further configured to enforce the SLA monitoring policies in effect throughout the end-to-end SLA monitoring architecture 116.

Additionally, the NFV SLA controller 102 is configured to perform attestations, or trust evaluations, on the telemetry data. In other words, the NFV SLA controller 102 is configured to verify the accuracy/authenticity of the received telemetry data. The NFV SLA controller 102 may be further configured to monitor the health of the SLA monitoring agents and initiate a corrective action (e.g., create a new SLA monitoring agent, terminate an existing SLA monitoring agent, update the SLA monitoring policy, etc.) upon determining the health of one or more of the SLA monitoring agents may compromise the integrity of one or more components of the end-to-end SLA monitoring architecture 116. Accordingly, the NFV SLA controller 102 may be configured to receive failure detection and corrective options from the SLA monitoring agents.

It should be appreciated that, in some embodiments, the NFV SLA controller 102 may be embedded into an existing component of the end-to-end SLA monitoring architecture 116 (e.g., the NFV orchestrator 104, the VIM 106, etc.) or as a standalone unit, as shown in the illustrative embodiment of the end-to-end SLA monitoring architecture 116 of FIG. 1. For example, in some embodiments, the NFV SLA controller 102 may be co-located with the NFV orchestrator 104, such as in an NFV management and orchestration (MANO) architectural framework. It should be further appreciated that, in some embodiments, the NFV SLA controller 102 may have a higher security privilege than the other network monitoring and SLA monitoring components of the end-to-end SLA monitoring architecture 116 to ensure the integrity and security of the NFV SLA controller 102.

It should be appreciated that the network processing components and the SLA monitoring components of the end-to-end SLA monitoring architecture 116 may be deployed in various virtualization network architectures, such as a virtual Evolved Packet Core (vEPC) infrastructure, a virtualized Customer Premise Equipment (vCPE) infrastructure, or any other type of operator visualized infrastructure. It should be further appreciated that, depending on the network architecture in which the end-to-end SLA monitoring architecture 116 is deployed, the end-to-end SLA monitoring architecture 116 may include one or more NFV SLA controllers 102, one or more NFV orchestrators 104, one or more VIMs 106, and/or one or more NFV infrastructures 108.

Figure 2:
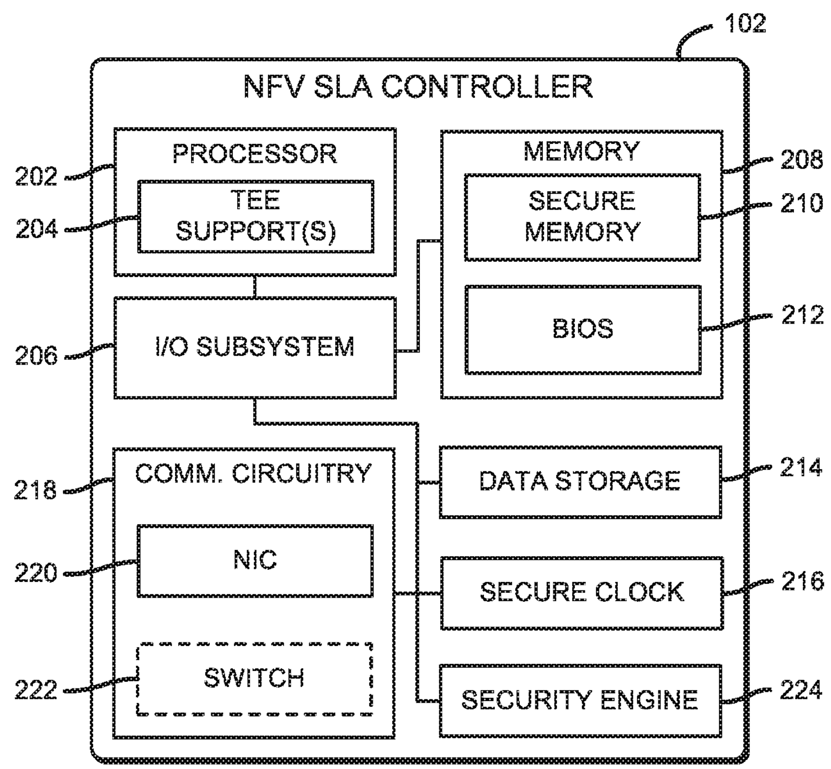
FIG. 2 is a simplified block diagram of at least one embodiment of the NFV SLA controller of the end-to-end SLA monitoring architecture of the system of FIG. 1.

The NFV SLA controller 102 may be embodied as, or otherwise include, any type of computing device, circuitry, hardware, software, and/or firmware capable of performing the functions described herein. As shown in FIG. 2, in an illustrative embodiment, the NFV SLA controller 102 includes a processor 202, an input/output (I/O) subsystem 206, a memory 208, a data storage device 214, a secure clock 216, communication circuitry 218, and a security engine 224. Of course, the NFV SLA controller 102 may include other or additional components, such as those commonly found in a server (e.g., various input/output devices), in other embodiments. Additionally, in some embodiments, one or more of the illustrative components may be incorporated in, or otherwise form a portion of, another component. For example, the memory 208, or portions thereof, may be incorporated in the processor 202 in some embodiments.

The processor 202 may be embodied as any type of processor capable of performing the functions described herein. For example, the processor 202 may be embodied as a single processor, one or more multi-core processors, a digital signal processor, a microcontroller, or other processor or processing/controlling circuit. The illustrative processor 202 includes one or more trusted execution environment (TEE) supports 204, or secure enclave supports, which may be utilized by the NFV SLA controller 102 to establish a TEE. It should be appreciated that, in some embodiments, the TEE supports 204 provide hardware-reinforced security for the TEE in which executing code may be measured, verified, or otherwise determined to be authentic.

For example, the TEE supports 204 may be embodied as Intel® Software Guard Extensions (SGX) technology. Although the TEE supports 204 are illustratively shown in the processor 202, it should be appreciated that, in some embodiments, one or more of the other components of the NFV SLA controller 102 may include the TEE supports 204. Further, in some embodiments, the processor 202 of the NFV SLA controller 102 may include a security engine (SE) (see, e.g., the security engine 224 discussed below), a manageability engine (ME), or a security co-processor configured to utilize the TEE supports 204 to establish a TEE (see, e.g., the TEE 408 of FIG. 4).

The memory 208 may be embodied as any type of volatile or non-volatile memory or data storage capable of performing the functions described herein. In operation, the memory 208 may store various data and software used during operation of the NFV SLA controller 102 such as operating systems, applications, programs, libraries, and drivers. The memory 208 is communicatively coupled to the processor 202 via the I/O subsystem 206, which may be embodied as circuitry and/or components to facilitate input/output operations with the processor 202, the memory 208, and other components of the NFV SLA controller 102. For example, the I/O subsystem 206 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The illustrative memory 208 includes a secure memory 210. In some embodiments, the secure memory 210 may be embodied as a secure partition of the memory 208. Additionally or alternatively, in other embodiments, the secure memory 210 may be embodied or included on a separate hardware component of the NFV SLA controller 102. As described herein, the secure memory 210 may store various data provisioned to the NFV SLA controller 102. For example, the secure memory 210 may store a secure key (e.g., an attestation key, a private direct anonymous attestation (DAA) key, an Enhanced Privacy Identification (EPID) key, or any other type of secure/cryptographic key) of the NFV SLA controller 102 that may be provisioned by a manufacturer of the chipset and/or of a TEE. The secure memory 210 may also store a password, a personal identification number (PIN), or other unique identifier of the NFV SLA controller 102 provisioned therein, for example, by an original equipment manufacturer (OEM) of the NFV SLA controller 102. Of course, it should be appreciated that the secure memory 210 may store various other data depending on the particular embodiment (e.g., group names, device identifiers, whitelists, expected PIN values, etc.). In some embodiments, the provisioned data may be stored in read-only memory of the secure memory 210.

The illustrative memory 208 additionally includes a basic I/O system (BIOS) 212. The BIOS 212 includes instructions (e.g., a BIOS driver used during booting of the NFV SLA controller 102) to initialize the NFV SLA controller 102 during the boot process. In some embodiments, the NFV SLA controller 102 may facilitate the management of the SLA monitoring agents through a main platform firmware, or pre-boot firmware, such as an extension of the Intel® platform chipset or the platform BIOS 212 based on the Unified Extensible Firmware Interface ("UEFI") specification, which has several versions published by the Unified EFI Forum.

The data storage device 214 may be embodied as any type of device or devices configured for short-term or long-term storage of data such as, for example, memory devices and circuits, memory cards, hard disk drives, solid-state drives, or other data storage devices. In use, the data storage device 214 and/or the memory 208 may store SLA monitoring policies, configuration policies, and/or other similar data.

The secure clock 216 may be embodied as any hardware component(s) or circuitry capable of providing a secure timing signal and otherwise performing the functions described herein. For example, in the illustrative embodiment, the secure clock 216 may generate a timing signal that is separate and functionally independent from other clock sources of the NFV SLA controller 102. Accordingly, in such embodiments, the secure clock 216 may be immune or resistant to alteration by other entities such as, for example, software executing on the NFV SLA controller 102. It should be appreciated that, in some embodiments, the secure clock 216 may be embodied as standalone component(s) or circuitry, whereas in other embodiments the secure clock 216 may be integrated with or form a secure portion of another component (e.g., the processor 202).

For example, in some embodiments, the secure clock 216 may be implemented via an on-chip oscillator and/or embodied as a secure clock of a manageability engine. It should further be appreciated that the secure clock 216 may be synchronized to the secure clocks of the other network processing components of the end-to-end SLA monitoring architecture 116 (e.g., the secure clock 316 of the illustrative NFV SLA controller 102 of FIG. 3) and granularity may be of the order that can distinguish distinct message timings.

The communication circuitry 218 of the NFV SLA controller 102 may be embodied as any communication circuit, device, or collection thereof, capable of enabling communications between the NFV SLA controller 102 and another network processing component of the illustrative system of FIG. 1 (e.g., the NFV orchestrator 104, the VIM 106, the endpoint devices 118, 120) and/or other connected network enabled computing node. The illustrative communication circuitry 218 includes a network interface controller (NIC) 220 and, in some embodiments, a switch 222.

The NIC 220 may be embodied as one or more add-in-boards, daughtercards, network interface cards, controller chips, chipsets, or other devices that may be used by the computing node 110. For example, the NIC 220 may be embodied as an expansion card coupled to the I/O subsystem 206 over an expansion bus, such as PCI Express. The switch 222 may be embodied as any hardware component(s) or circuitry capable of performing network switch operations and otherwise performing the functions described herein, such as an Ethernet switch chip, a PCI Express switching chip, etc. Alternatively, in some embodiments, the switch 222 may be embodied as a virtual switch, such as an Open vSwitch, a VMWare virtual switch, or the like.

As described above, the NFV SLA controller 102 may also include a security engine 224, which may be embodied as any hardware component(s) or circuitry capable of establishing a TEE on the NFV SLA controller 102 (see, e.g., the TEE 408 of FIG. 4). In particular, the security engine 224 may support executing code and/or accessing data that is independent and secure from other code executed by the NFV SLA controller 102. The security engine 224 may be embodied as a Trusted Platform Module (TPM) (e.g., physical or virtual), an ME, an out-of-band (00B) processor, or other security engine device or collection of devices. In some embodiments the security engine 224 may be embodied as a converged security and manageability engine (CSME) incorporated in a system-on-a-chip (SoC) of the NFV SLA controller 102.

Referring again to FIG. 1, the NFV orchestrator 104 may be embodied as any type of circuitry, hardware, software, and/or firmware components capable of performing the functions described herein. In use, the NFV orchestrator 104 is configured to manage the lifecycles (e.g., instantiation, scale-out/in, performance measurements, event correlation, termination, etc.) of virtual network functions (VNFs) of the NFV infrastructure 108 (see, e.g., the VNFs 420 of FIG. 4). To do so, the NFV orchestrator 104 is configured to communicate with one or more VNF managers (see, e.g., the VNF manager 414 of FIG. 4), each of which may be responsible for managing one or more VNFs. The NFV orchestrator 104 is further configured to manage global resources, validate and authorize resource requests of the NFV infrastructure 108, on-board new VNFs, and/or manage various policies and packages for the VNFs. For example, the NFV orchestrator 104 may be configured to receive resource requests from an operator that impacts a particular one of the VNFs. Additionally, the NFV orchestrator 104 manages any applicable processing, storage, and/or network configuration adjustments, based on the operator requests, to bring the VNFs into operation and/or compliance with the resource requests. Once in operation, the NFV orchestrator 104 may monitor the VNFs for capacity and utilization, which may be adjusted by the NFV orchestrator 104, as necessary.

The VIM 106 may be embodied as, or otherwise include, any type of hardware, software, and/or firmware capable of performing the functions described herein, such as controlling and managing the NFV infrastructure 108 compute, storage, and network resources (e.g., physical and virtual) within one operator's infrastructure sub-domain, as well as collection and forwarding of performance measurements and events. It should be appreciated that, in some embodiments, the NFV orchestrator 104 may be co-located with the VIM 106, such as in the NFV MANO architectural framework.

The NFV infrastructure 108 may be embodied as, or otherwise include, any type of virtual and/or physical processing and storage resources, such as one or more servers or other computing nodes, as well as virtualization software. The illustrative NFV infrastructure 108 includes one or more computing nodes 110, each of which are capable of managing (e.g., creating, moving, destroying, etc.) a number of virtual machines (VMs) configured to operate as VNF instances, which are described in further detail below. The illustrative computing nodes 110 includes a first computing node, designated as computing node (1) 112, and a second computing node, designated as computing node (N) 114 (i.e., the "Nth" computing node of the computing nodes 110, wherein "N" is a positive integer and designates one or more additional computing nodes 110).

Figure 3:
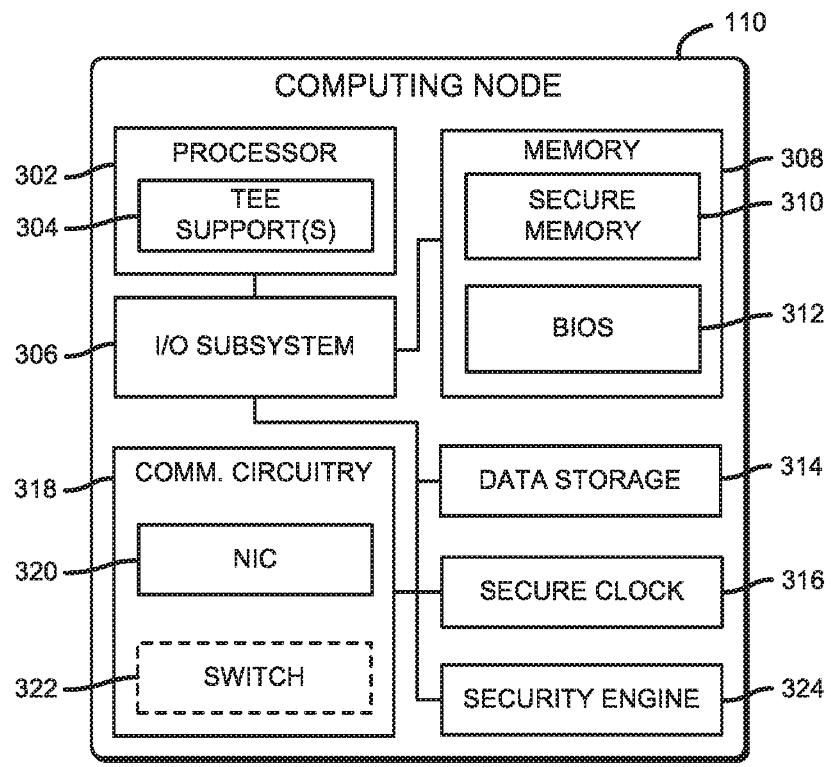
FIG. 3 is a simplified block diagram of at least one embodiment of one of the computing nodes of the end-to-end SLA monitoring architecture of the system of FIG. 1.

Each of the computing nodes 110 may be embodied as any type of computation or computer device capable of performing the functions described herein, including, without limitation, a server (e.g., stand-alone, rack-mounted, blade, etc.), a network appliance (e.g., physical or virtual), a high-performance computing device, a web appliance, a distributed computing system, a computer, a processor-based system, a multiprocessor system, a smartphone, a tablet computer, a laptop computer, a notebook computer, and/or a mobile computing device. As shown in FIG. 3, similar to the illustrative NFV SLA controller 102 of FIG. 2, the illustrative computing node 110 includes a processor 302 that includes TEE support(s) 304, an input/output (I/O) subsystem 304, a memory 306 that includes a secure memory 310 and a BIOS 312, a data storage device 314, a secure clock 316, communication circuitry 312 that includes a NIC and, in some embodiments, a switch, as well as a security engine 324. As such, further descriptions of the like components are not repeated herein to preserve clarity of the description with the understanding that the description of the corresponding components provided above in regard to the illustrative NFV SLA controller 102 of FIG. 2 applies equally to the corresponding components of the illustrative computing node 110 of FIG. 3.

Referring again to FIG. 1, the illustrative system 100 includes a first endpoint device, designated as endpoint device (1) 118, communicatively coupled via the NFV SLA monitoring architecture to a second endpoint device, designated as endpoint device (2) 120. However, it should be appreciated that any number of endpoint devices may be communicatively coupled through the end-to-end SLA monitoring architecture 116. It should be further appreciated that the endpoint devices 118, 120 are communicatively coupled with the end-to-end SLA monitoring architecture 116 via a network (not shown), using wired or wireless technology, to form an end-to-end communication system in which the endpoint device (1) 118 can communicate with the endpoint device (2) 120, and vice versa. In other words, one or more network computing devices (e.g., routers, switches, hubs, access points, etc.) may connect the endpoint devices 118, 120 to the end-to-end SLA monitoring architecture 116. As such, the network processing components of the end-to-end SLA monitoring architecture 116 can monitor and process the network communication traffic (i.e., network packets) transmitted between the endpoint devices 118, 120.

The network via which the endpoint devices 118, 120 communicate may be embodied as any type of wired or wireless communication network, including cellular networks, such as Global System for Mobile Communications (GSM) or Long-Term Evolution (LTE), telephony networks, digital subscriber line (DSL) networks, cable networks, local or wide area networks, global networks (e.g., the Internet), or any combination thereof. For example, in some embodiments, the network may be embodied as an NFV-based Long-Term Evolution (LTE) network having a vEPC architecture. It should be appreciated that the network may serve as a centralized network and, in some embodiments, may be communicatively coupled to another network (e.g., the Internet). Accordingly, the network may include a variety of network devices, virtual and physical, such as routers, switches, network hubs, servers, storage devices, compute devices, etc., as needed to facilitate communication between the endpoint devices 118, 120 and the end-to-end SLA monitoring architecture 116.

The endpoint devices 118, 120 may be embodied as any type of computation or computer device capable of performing the functions described herein, including, without limitation, a smartphone, a mobile computing device, a tablet computer, a laptop computer, a notebook computer, a computer, a server (e.g., stand-alone, rack-mounted, blade, etc.), a network appliance (e.g., physical or virtual), a router, a switch, a web appliance, a distributed computing system, a processor-based system, and/or a multiprocessor system. It should be appreciated that the endpoint devices 118, 120 include similar or like components to those of the illustrative NFV SLA controller 102, such as a processor, an I/O subsystem, a memory, a data storage device, one or more peripheral devices, communication circuitry 312, etc. As such, further descriptions of the like components are not repeated herein for clarity of the description with the understanding that the description of the corresponding components provided above in regard to the NFV SLA controller 102 of FIG. 2 applies equally to the corresponding components of the endpoint devices 118, 120.

Of course, one or both of the endpoint devices 118, 120 may include other or additional components, such as those commonly found in a mobile computing device capable of operating in a telecommunications infrastructure in other embodiments (e.g., various input/output devices). In other words, it should be appreciated that certain components of the endpoint devices 118, 120 may be configured to perform tasks relevant to the type of endpoint device in use, rather than as described relative to the NFV SLA controller 102. For example, the communication circuitry of the endpoint devices 118, 120 may be configured to use any one or more communication technology (e.g., wired or wireless communications) and associated protocols (e.g., Ethernet, Bluetooth®, Wi-Fi®, WiMAX, GSM, LTE, etc.) to communication with the aforementioned network computing devices.

Additionally, in some embodiments, one or more of the illustrative components may be incorporated in, or otherwise form a portion of, another component. For example, the peripheral devices may include any number of input/output devices, interface devices, and/or other peripheral devices, such as a display, touch screen, graphics circuitry, keyboard, mouse, speaker system, and/or other input/output devices, interface devices, and/or peripheral devices.

Referring now to FIG. 4, an illustrative embodiment of the end-to-end SLA monitoring architecture 116 of FIG. 1 for SLA monitoring of the end-to-end SLA monitoring architecture 116 includes the NFV SLA controller 102, the NFV orchestrator 104, the VIM 106, and the NFV infrastructure 108 of FIG. 1. While the embodiments described herein illustrate a generally telecommunications-centric architecture, it should be appreciated by those skilled in the art that components, functions, and principles provided in the present disclosure may be used in other applications, such as multi-tenant public cloud deployments, for example.

In some embodiments, each network processing component of the illustrative end-to-end SLA monitoring architecture 116 may include a globally unique security identifier that uniquely identifies the corresponding network processing component. The globally unique security identifier may be based on, for example, a media access control (MAC) address of the security monitoring component, an internet protocol (IP) address assigned to the security monitoring component, an identifier embedded into a secure memory 210 of the SLA monitoring component (e.g., a BIOS 212 (UEFI) identifier, an identifier of an operating system of the security monitoring component, etc.).

In some embodiments, the globally unique identifier may be protected within a physical TPM or a software-based trusted module, such as a firmware TPM on the security engine 224 (e.g., an ME, a CSME, an innovation engine (IE)), a secure partition, a security co-processor or separate processor core, etc.). Additionally, the globally unique identifier may be stored in a secure location (e.g., the secure memory 210). Any of the network processing and/or SLA monitoring components, or the functionality thereof, may be instantiated in a secure environment (e.g., the TEE supports 204 of the processor 202). As such, every instantiation may be identified by the globally unique identifier. Further, in some embodiments, the globally unique identifier may be bound to a use-case messaging upon instantiation.

Additionally, each unique usage instance may include a unique usage identifier. Accordingly, multiple usages and flows within the end-to-end SLA monitoring architecture 116 can be uniquely identified, such as for auditing, authenticating, controlling, debugging, etc. As described previously, in some embodiments, the end-to-end SLA monitoring architecture 116 may include one or more instances of the NFV SLA controller 102, the NFV orchestrator 104, and the VIM 106. In such embodiments, the multiple instances of the components may be mirrored to use the same external identifier, and additionally include a unique internal identifier (e.g., an instance identifier) to distinguish between the mirrored components.

Further, each logical component of the end-to-end SLA monitoring architecture 116 may be segregated into more than one physical and/or logical component(s) to address specific usages, such as SLA monitoring policies, inter-VNF communication keys, security policies, etc. In such embodiments, the physical and/or logical components may be signed along with a globally unique identifier (GUID) by the operator or cloud provider, which may be verified prior to installation. The signing may be performed using a private key, whose public key (e.g., certificate key, fuse key, device specific key, etc.) may be embedded into the NFV infrastructure 108 and accessed by the VNFs instantiated therein. Accordingly, the verification may be performed by the VNFs, or corresponding SLA monitoring agents of the VNFs (see, e.g., the SLA agents 430 of the VNFs 420 of FIG. 4), within strict control of the environment of the physical and/or logical components.

As described previously, the telemetry data, as well as other messages (e.g., SLA policy provisioning messages), transmitted throughout the network processing components of the end-to-end SLA monitoring architecture 116 require secure transmission via secure communication channels. It should be appreciated that "secure" in this context refers to the authentication of the message/telemetry data source (e.g., the NFV SLA controller 102, the SLA agents, etc.) and/or confidentiality, integrity, and/or data-authentication of the communications transmitted across the secure communication channel, such as may be secured using any known secure messaging technologies (e.g., message authentication codes, encryption, etc.). For example, the secure communication channels of the end-to-end SLA monitoring architecture 116 may be protected with secure keys (e.g., session keys and/or other cryptographic keys) used by the NFV SLA controller 102 to establish a root of trust (RoT) to establish each of the secure communication channels. In some embodiments, the secure keys may be embodied as pairwise session keys that may be refreshed periodically. As such, the NFV SLA controller 102 can be additionally configured to act as an authentication server.

The end-to-end SLA monitoring architecture 116 additionally includes an operations support systems and business support systems (OSS/BSS) 402 communicatively coupled to the NFV orchestrator 104. The OSS/BSS 402 may be embodied as any type of computation or computing node capable of performing the functions described herein, such as supporting various end-to-end telecommunication services in a telephone network. In some embodiments, the OSS/BSS 402 may be configured to support management functions such as network inventory, service provisioning, network configuration, and fault management, as well as various business functions to support end-to-end telecommunication services that may be supported by the OSS/BSS 402, such as product management, customer management, revenue management, order management, etc.

As described previously, the NFV orchestrator 104 is configured to manage the lifecycle of the VNFs in the NFV infrastructure 108, including instantiation, scaling-out/in, measuring performance, correlating events, termination, etc. To do so, the NFV orchestrator 104 is configured to provide instructions to a VNF manager 414 which are usable to manage the initialization and configuration (i.e., scaling and deployment) of the VNF instances 420 of the NFV infrastructure 108 based on resources of the NFV infrastructure 108. It should be appreciated that one or more of the VNF instances 420 may be shared between multiple tenants to ensure that each tenant is getting their agreed upon share of resources.

In addition to managing the initialization and configuration (i.e., scaling and deployment) of the VNF instances 420, the VNF manager 414 is further configured to perform overall coordination and adaptation for configuration and event reporting for the NFV infrastructure 108. The VNF manager 414 is additionally configured to update and ensure the integrity of the VNFs. To do so, the VNF manager 414 is configured to consult with the VIM 106 (i.e., via a secure communication channel) to determine the available physical resources on which to instantiate particular VNF instances. It should be appreciated that the VIM 106 may make such a determination using any suitable techniques, algorithms, and/or mechanisms. It should be further appreciated that, in some embodiments a single VNF manger 414 may be responsible for managing one or more VNF instances. For example, in some embodiments, a VNF manager 414 may be instantiated for each of the VNF instances. The illustrative VNF manager 414 includes an SLA agent 416 that is configured to perform the functions of an SLA agent (i.e., an SLA monitoring agent) as described herein.

As described previously, the VIM 106 is configured to control and manage the allocation of virtual and hardware compute, storage, and network resources of the NFV infrastructure 108 via secure messages. The illustrative VIM 106 includes an SLA monitoring agent 412 usable to securely collect and packet telemetry data. The VIM 106 may include any additional physical and/or virtual compute, storage, and network resources of the VIM 106 as may be needed to install the VNF instances and/or activate services. For example, in some embodiments, the VIM 106 may include one or more VNF image management controllers (not shown), such as OpenStack Nova for installation and provisioning the VNF instances 420. In another example, in some embodiments, the VIM 106 may include a VIM controller (not shown) that is configured to function as a network policy controller, or a networking service controller, such as a software defined networking (SDN) controller or an OpenStack Neutron, for example.

In some embodiments, the VIM 106 may be configured to instantiate tenant specific VNFs and maintain a secure accounting of all the VNFs that are configured to process that tenant's network traffic. Additionally, in some embodiments, the VIM 106 may be configured to maintain a similar accounting for service function chains (SFCs) that are configured to process network traffic of a particular tenant. Accordingly, such information may be usable to maintain and update migrated tenant VNFs.

The illustrative NFV SLA controller 102 of FIG. 4 includes a TEE 408 and an SLA analysis engine 410. As described previously, the TEE 408 is an isolated, secure area of the processor 202 configured to protect the confidentiality and integrity of the processes performed therein. Accordingly, the SLA analysis engine 410 can be configured to securely collect SLA telemetry data from across the deployments, authenticate the telemetry, perform secure temporal checks using secure clocks, and ensure freshness of the received SLA telemetry data. To do so, the NFV SLA controller 102 may be configured to continually parse the telemetry data, correlate for tenants, and deliver a signed and time-stamped SLA report to the OSS/BSS 402.

Additionally, the NFV SLA controller 102 is configured to interface with logical, secure databases. Accordingly, it should be appreciated that such databases may be local to the NFV SLA controller 102 or the network processing component on which the NFV SLA controller 102 resides. The illustrative end-to-end SLA monitoring architecture 116 of FIG. 4 includes an SLA policy database 404 and an SLA audit database 406 securely coupled to the NFV SLA controller 102. It should be appreciated that, in some embodiments, the SLA policy database 404 and/or the SLA audit database 406 may reside in the same computing device in which the NFV SLA controller 102 is housed.

The SLA policy database 404 includes SLA policy information, such as may be received from the OSS/BSS 402 via the NFV orchestrator 104. The SLA policy information includes any data related to the SLA policy, such as instructions usable to translate telemetry data into performance metrics and baseline performance levels in accordance with the SLA from which the SLA policy has been derived. The SLA audit database 406 includes received telemetry data received from the various SLA monitoring components of the end-to-end SLA monitoring architecture 116 by the NFV SLA controller 102. The SLA audit database 406 may additionally include configuration change logs, network traces, debug traces, application traces, etc.

The SLA monitoring agents are configured timestamp collected telemetry data prior to transmission, such as by a secure clock (e.g., the secure clock 316 of FIG. 3) accessible by the SLA monitoring agent or the respective network processing component on which the SLA monitoring agent resides. Accordingly, the NFV SLA controller 102 can audit the telemetry data (i.e., verify, authenticate, sequence the telemetry data, etc.) based on the timestamp(s) associated with the telemetry data. Additionally, the NFV SLA controller 102 may use a secure clock (e.g., the secure clock 216 of FIG. 2) to timestamp the received telemetry data prior to securely storing the telemetry data in the SLA audit database 406.

The NFV infrastructure 108 includes all of the hardware and software components (i.e., virtual compute, storage, and network resources, virtualization software, hardware compute, storage, and network resources, etc.) of the computing nodes (e.g., the computing nodes 110 of FIG. 1) from which the VNFs may be deployed. It should be appreciated that the physical and/or virtual components of the NFV infrastructure 108 may span across different locations, data centers, geographies, providers, etc. Additionally, it should be further appreciated that the network through which the components of the NFV infrastructure 108 use to communicate and interface through may be considered to be included in the NFV infrastructure 108.

The illustrative NFV infrastructure 108 includes one or more platforms 440, the BIOS 312 of FIG. 3, a hypervisor 436, and one or more VNF instances 420. The illustrative platforms 440 include a first platform, designated as platform (1) 442, and a second platform, designated as platform (N) 442 (i.e., the "Nth" platform, wherein "N" is a positive integer and designates one or more additional platforms 440). Each of the platforms 440 includes the components of the computing nodes 110, such as the I/O subsystem 306, the clock 316, the NIC 320, the switch 322, etc. The illustrative NFV infrastructure 108 additionally includes an SLA monitoring agent 434 being executed in a TEE 432. In other words, the functions performed by the SLA monitoring agent 434 may be performed in an isolated, secure environment. As such, the SLA monitoring agent 434 can securely collect telemetry data at a hardware level (i.e., from the I/O subsystem 306, the NIC 320, and/or the switch 322) and/or a BIOS level (i.e., at the BIOS 312 and/or the hypervisor 436). For example, the telemetry data collected by the SLA monitoring agent 434 may include NIC configuration information, various hardware flaws, errors, and/or anomalies, bandwidth usage, queue information, network packet behaviors (e.g., round-trip-times, jitter, throughput, latency, packet loss, etc.), and any other type of quantifiable metric usable to monitor service levels of the end-to-end SLA monitoring architecture 116. Upon collection of the telemetry data, the collected telemetry data is securely packaged and transmitted to the NFV SLA controller 102 via a secure communication channel. To do so, the SLA monitoring agent 434 may use manual key provisioning, pre-shared keys, and/or bootstrapping using another mutual authentication function of the NFV SLA controller 102. Further, the secure communication channel can be protected by one or more secure keys, such as a unique pairwise random key session that has a configured reasonably finite key lifetime.

The hypervisor 436, or virtual machine monitor (VMM), is configured to run the VNF instances 420, generally via one or more VMs for running each a number of VNF instances (e.g., the VNF instances 420). To do so, the hypervisor 436 is configured to establish and/or utilize various virtualized hardware resources (e.g., virtual memory, virtual operating systems, virtual networking components, etc.) of the NFV infrastructure 108. Additionally, the hypervisor 462 may facilitate communication across the VNF instances 420 and/or one or more VNF components (VNFCs), which are described below. As such, the hypervisor 436 may include additional components (e.g., a virtual router) which are not shown to preserve clarity of the description. It should be appreciated that, in some embodiments, alternative technologies to the hypervisor 436 may be deployed to run the VMs, such as containers.

In some embodiments, the VNF instances 420 may include any number of VNFs to perform network services, such as may be performed in service function chaining (SFC) or a VNF forwarding graph (i.e., a series of VNFs performed in an ordered sequence to implement the desired network service(s)). For example, the VNF instances 420 may include multiple VNFs, each configured to process network traffic by performing a virtualized network service, such as a firewall service, a NAT service, a DPI service, an EPC service, an MME service, a PGW service, a SGW service, a billing service, a TCP optimization service, and/or other virtual network service(s).

The illustrative VNF instances 420 include a first VNF (i.e., VNF (1) 422) and a second VNF (i.e., VNF (N) 424) (i.e., the "Nth" VNF, wherein "N" is a positive integer and designates one or more additional VNF instances 420). The illustrative VNF instances 420 additionally includes a network VNF 426 (e.g., a virtual switch (vSwitch) or a virtual router (vRouter)) and one or more security VNFs (e.g., firewalls, intrusion detection/prevent systems, anti-malware, sandboxes, security identity managers, data loss prevention, or any other security based VNFs). As described previously, each of the VNF instances 420 is associated with a particular VNF manager (e.g., the VNF manager 414), which the VNF instances 420 may connect to in order to receive policy information and other data (e.g., signatures for malware, etc.) upon secure instantiation (e.g., secure bootstrapping of the VNF instances 420). It should be appreciated that one or more of the VNF instances 420 may be instantiated on one or more VMs.

Each of the illustrative VNF instances 420 includes an SLA agent 430. Each of the SLA agents 430 is configured to securely collect and package telemetry data based on an SLA policy received from the NFV SLA controller 102. The telemetry data extraction (i.e., collection) can be initiated using appropriate hooks within the NFV infrastructure 108, such as at an Open vSwitch, an Open vRouter, the DPDK, a hardware NIC (e.g., the NIC 320), a hardware switch (e.g., the switch 322), or a hardware router, etc., that are connected with the respective SLA agent 430. In an illustrative example, an SLA agent 430 instantiated and activated within one of the VNF instances 420 may communicate with an Intel® DPDK user plane application (e.g., a vSwitch, a vRouter, EPC systems, etc.) to extract telemetry data. In another illustrative example, the SLA agent 430 may communicate with a virtual router (e.g., an Open vSwitch of the virtual router) to extract telemetry data.

As described previously, the telemetry data may include information relative to the network traffic processed at a particular network processing component on which the SLA monitoring agent resides, such as network packet behaviors including round-trip-times, jitter, throughput, latency, packet loss, etc. The telemetry data may additionally or alternatively include component-level configuration, operation, and/or policy data respective of the network processing component. For example, the telemetry data may include QoS metrics for memory, QoS metrics for cache, NIC queue metrics, switch queue metrics, platform reliability metrics, etc.

In some embodiments, a particular VNF instance 420 may have multiple sub-instances, which could be executing on a single platform (e.g., one of the platforms 440) or across different platforms (e.g., the platform 442 and the platform 444). In other words, when virtualized, network functions traditionally handled by physical hardware co-located within a particular platform may be distributed as a number of VNF instances 420 across one or more of the platforms 440. Each of the VNF instances 420 may include any number of VNFs, each of which may include one or more VNFCs. It should be appreciated that the VNF instances 420 may be embodied as any suitable virtual network functions; similarly, the VNFCs may be embodied as any suitable VNF components. The VNFCs are processes and/or instances that cooperate to deliver the functionality of one or more VNF instances 420. For example, in some embodiments, the VNFCs may be sub-modules of the VNF instances 420.

Similar to the VNF instances 420, it should be appreciated that the VNFCs may be distributed across one or more platforms 440. Further, it should be appreciated that a particular VNF instance 420 may be distributed across multiple platforms 440 and still form a part of a VNF instance 420 established on one of the platforms 440. In some embodiments, the VNF instances 420 and/or the VNFCs may be executing on the same platform (e.g., the platform 442 or the platform 444) or within the same data center but on different platforms 440. Further, in some embodiments, the VNF instances 420 and/or the VNFCs may be executing across different data centers.

It should be appreciated that the network processing components and the SLA monitoring components of the end-to-end SLA monitoring architecture 116 can be deployed across different geographies, across different hosting data centers, and/or over untrusted networks. Further, the SLA monitoring components of the end-to-end SLA monitoring architecture 116 can be securely provisioned within the end-to-end SLA monitoring architecture 116. Additionally, the SLA monitoring components are configured to securely collect telemetry data from across the control, management, and/or data planes running atop various VNFs, such as within a vEPC architecture, for example.

It should be appreciated that the SLA monitoring (i.e., the collection of the telemetry data by the SLA monitoring agents, secure transmission of the telemetry data, and analysis by the NFV SLA controller 102) may be performed independent of the hypervisor 436. In other words, trust in the hypervisor 436, or other controller technology depending on the embodiment, may not be required. Additionally, deployment of the NFV SLA controller 102 and the associated SLA monitoring agents to securely collect the telemetry data may avoid particular resource usages (e.g., VNF, VM, container resource usages) typically having an impact the SLA.

Figure 5:
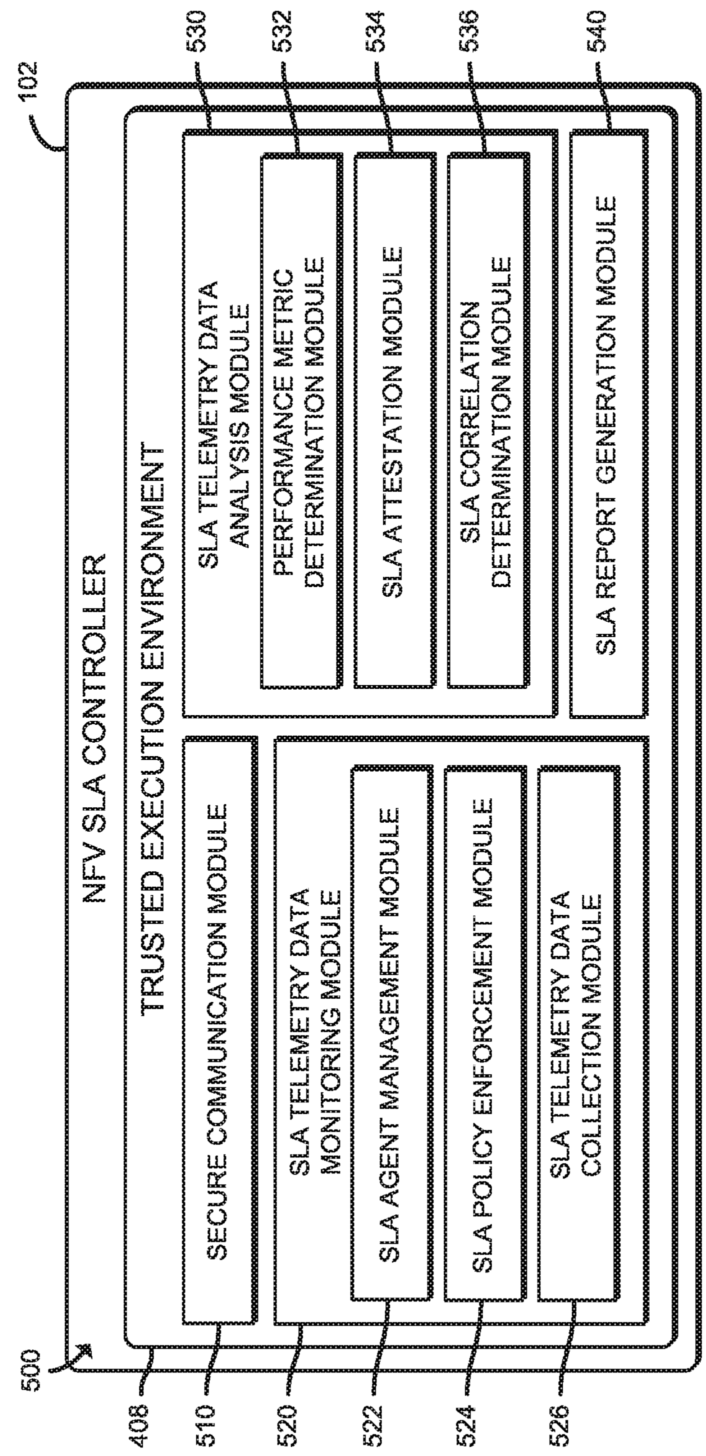
FIG. 5 is a simplified block diagram of at least one embodiment of an environment of an NFV SLA controller of the NFV security architecture of FIGS. 1 and 4.

Referring now to FIG. 5, in an illustrative embodiment, the NFV SLA controller 102 establishes an environment 500 during operation. The illustrative environment 500 includes a secure communication module 510, an SLA telemetry data monitoring module 520, an SLA telemetry data analysis module 530, and an SLA report generation module 540. The various modules of the environment 500 may be embodied as hardware, firmware, software, or a combination thereof. As such, in some embodiments, one or more of the modules of the environment 500 may be embodied as circuitry or collection of electrical devices (e.g., a secure communication circuit 510, an SLA telemetry data monitoring circuit 520, an SLA telemetry data analysis circuit 530, and an SLA report generation circuit 540).

It should be appreciated that, in such embodiments, one or more of the secure communication circuit 510, the SLA telemetry data monitoring circuit 520, the SLA telemetry data analysis circuit 530, and the SLA report generation circuit 540 may form a portion of one or more of the processor 202, the I/O subsystem 206, the communication circuitry 218, the security engine 224, and/or one or more other components of the NFV SLA controller 102. Additionally, in some embodiments, one or more of the illustrative modules may form a portion of another module and/or one or more of the illustrative modules may be independent of one another. Further, in some embodiments, one or more of the modules of the environment 500 may be embodied as virtualized hardware components or emulated architecture, which may be established and maintained by the processor 202 or other components of the NFV SLA controller 102.

The secure communication module 510, which may be embodied as hardware, firmware, software, virtualized hardware, emulated architecture, and/or a combination thereof as discussed above, is configured to facilitate the secure transmission of data (e.g., network traffic, messages, telemetry data, etc.) to and from the NFV SLA controller 102. For example, the secure communication module 510 is configured to receive securely packaged and transmitted data received from the SLA monitoring agents of the NFV infrastructure 108 (e.g., the SLA monitoring agent 412 of the VIM 106, the SLA monitoring agent 416 of the VNF manager 414, the SLA agents 430 of the VNF instances 420, and the SLA monitoring agent 434 of the NFV infrastructure 108) via secure communication channels, such as by using protection credentials provided by the NFV SLA controller 102 (e.g., the secure communication module 510). Further, the secure communication module 510 is configured to facilitate the secure transmission of data between the NFV SLA controller 102 and the SLA policy database 404, as well as between the NFV SLA controller 102 and the SLA audit database 406.

To securely manage the data transmissions, in some embodiments, the secure communication module 510 may include a unique identifier of the instance of the NFV SLA controller 102 that is performing the transmission, as well as an authentication key. In such embodiments, the secure communication module 510 may perform various key management functions, cryptographic functions, secure communication channel management, and/or other security functions, such as using pairwise session keys that are refreshed periodically. Accordingly, the security monitoring component that receives the message can authenticate the messages received from the NFV SLA controller 102.

The SLA telemetry data monitoring module 520, which may be embodied as hardware, firmware, software, virtualized hardware, emulated architecture, and/or a combination thereof as discussed above, is configured to monitor telemetry data of the component and/or level at which the particular SLA monitoring agent is located. The SLA telemetry data monitoring module 520 is additionally configured to monitor the telemetry data actively and/or passively. To monitor the telemetry data, the illustrative SLA telemetry data monitoring module 520 includes an SLA monitoring agent management module 522, an SLA policy enforcement module 524, and an SLA telemetry data collection module 526.

It should be appreciated that each of the SLA monitoring agent management module 522, the SLA policy enforcement module 524, and the SLA telemetry data collection module 526 of the SLA telemetry data monitoring module 520 may be separately embodied as hardware, firmware, software, virtualized hardware, emulated architecture, and/or a combination thereof. For example, the SLA monitoring agent management module 522 may be embodied as a hardware component, while the SLA policy enforcement module 524, and the SLA telemetry data collection module 526 are embodied as a virtualized hardware component or as some other combination of hardware, firmware, software, virtualized hardware, emulated architecture, and/or a combination thereof.

The SLA monitoring agent management module 522 is configured to manage the SLA monitoring agents throughout the end-to-end SLA monitoring architecture 116. To do so, the SLA monitoring agent management module 522, prior to booting of the SLA monitoring agents, seeds the appropriate security and SLA monitoring policy configuration information, which may be extracted by the SLA monitoring agents at runtime, to perform particular tasks, such as to connect to the appropriate VNF manager (e.g., the VNF manager 414 of FIG. 4). In an illustrative embodiment in which the end-to-end SLA monitoring architecture 116 includes a number of instantiated VNFs of a service function chain, the SLA monitoring agent management module 522 may be configured to activate the VNF instances of the service function chain, initiate deployment (i.e., spin-up and instantiation) of the SLA monitoring agents by executing a bootstrap of an SLA monitoring agent on one or more of the VNFs of the service function chain, and receive bootstrap information (e.g., bootstrap configuration parameters that may be used by the bootstrap to instantiate the SLA monitoring agent, personalization information for that particular SLA monitoring agent instance, and/or license information of the SLA monitoring agent instance, etc.).

The SLA monitoring agent management module 522 is further configured to notify the corresponding VNF manager of an instantiated SLA monitoring agent. In some embodiments, the SLA monitoring agents may be configured to perform a mutually authenticated key exchange for establishing the secure communication channel with the SLA monitoring agent management module 522, which the SLA monitoring agent management module 522 may use to personalize the SLA monitoring agents (e.g., set name, SLA policy groups, security policy groups, per-tenant policies, distribute key material for secure session establishment with the respective VNF manager of the VNF instance on which a particular SLA monitoring agent resides, etc.).

The SLA policy enforcement module 524 is configured to enforce the SLA policies across the end-to-end SLA monitoring architecture 116. To do so, the SLA policy enforcement module 524 is configured to securely receive SLA monitoring policy information from an OSS/BSS (e.g., the OSS/BSS 402 of FIG. 4) communicatively coupled to the NFV SLA controller 102 (e.g., via the NFV orchestrator 104) and securely distribute the SLA policies to the SLA monitoring agents executing throughout the end-to-end SLA monitoring architecture 116. Additionally, the SLA policy enforcement module 524 is configured to verify the SLA monitoring policy at each of the SLA monitoring agents.

For example, the SLA policy enforcement module 524 is configured to verify the SLA monitoring policy at each of the SLA agents 430 of the VNF instances 420 of the NFV infrastructure 108. In such embodiments, the SLA policy enforcement module 524 may be configured to verify the policies at VNF runtime or at on-boarding of the VNF at the NFV infrastructure 108 to ensure the VNF instances 420 are configured correctly and that the SLA agents 430 presently running thereon are monitoring and collecting telemetry data that is consistent with the SLA monitoring policy. As described previously, the SLA policies may be securely stored in the SLA policy database 404. Accordingly, the SLA telemetry data collection module 526 is further configured to securely transmit the SLA policy information to the SLA policy database 404.

The SLA telemetry data collection module 526 is configured to securely receive telemetry data based on an SLA monitoring policy (e.g., the SLA monitoring policy distributed and enforced by the SLA policy enforcement module 524). As described previously, the telemetry data may include information relative to the network traffic processed at a particular network processing component on which the SLA monitoring agent resides, such as network packet behaviors including round-trip-times, jitter, throughput, latency, packet loss, etc. The telemetry data may additionally or alternatively include component-level configuration, operation, and/or policy data respective of the network processing component. For example, the telemetry data may include QoS metrics for memory, QoS metrics for cache, NIC queue metrics, switch queue metrics, platform reliability metrics, etc. The SLA telemetry data collection module 526 is further configured to parse the received telemetry data and securely transmit at least a portion of the received telemetry data to the SLA audit database 406. In some embodiments, the SLA telemetry data collection module 526 may be additionally configured to use a secure clock (e.g., the secure clock 216 of FIG. 2) to timestamp the telemetry data prior to transmission of the telemetry data to the SLA audit database 406 for secure storage.

The SLA telemetry data analysis module 530 is configured to analyze the telemetry data, such as may be collected by the SLA telemetry data monitoring module 520 (e.g., the SLA telemetry data collection module). To do so, the illustrative SLA telemetry data analysis module 530 includes a performance metric determination module 532, an SLA attestation module 534, and an SLA correlation determination module 536. It should be appreciated that each of the performance metric determination module 532, the SLA attestation module 534, and the SLA correlation determination module 536 of the SLA telemetry data analysis module 530 may be separately embodied as hardware, firmware, software, virtualized hardware, emulated architecture, and/or a combination thereof. For example, the performance metric determination module 532 may be embodied as a hardware component, while the SLA attestation module 534, and the SLA correlation determination module 536 are embodied as a virtualized hardware component or as some other combination of hardware, firmware, software, virtualized hardware, emulated architecture, and/or a combination thereof.

The performance metric determination module 532 is configured to determine one or more performance metrics based on the analysis, and compare the one or more performance metrics against respective performance benchmarks. The performance benchmarks may include any data that indicates expected quality of service (i.e., performance) levels associated with processing network traffic through the end-to-end SLA monitoring architecture 116, such as performance standards, performance thresholds, acceptable performance ranges, etc., as determined from an SLA. As described previously, the performance metrics may include any network data and/or network processing measurements usable to identify one or more performance levels of the end-to-end SLA monitoring architecture 116, such as application response time, usage statistics, resource utilization metric, etc. In some embodiments, the performance metric determination module 532 may be configured to determine the performance metrics on a per-tenant basis. In other words, the performance metrics may be based on telemetry data received or otherwise filtered to isolate a particular tenant. Accordingly, in such embodiments, out-of-band SLA monitoring may be supported.

The SLA attestation module 534 is configured to securely authenticate the received telemetry data that has been collected, packaged, and timestamped by the SLA monitoring agents. To do so, the SLA attestation module 534 is configured to verify the origin (e.g., the SLA monitoring agent and/or the network processing component on which the SLA monitoring agent resides) and any applicable timestamps (i.e., liveness) of the received telemetry data. For example, the SLA attestation module 534 may be configured to perform an audit on the telemetry data securely stored at the SLA audit database 406. In such embodiments, the SLA attestation module 534 is configured to analyze a timestamp associated with the telemetry data (e.g., as may be included with the telemetry data by the SLA monitoring agent prior to secure transmission of the telemetry data) to verify and sequence the telemetry data as part of the audit. It should be appreciated that the SLA attestation module 534 may audit the telemetry data prior to transmission to the SLA audit database 406 (i.e., prior to being securely stored) and/or prior to the performance metrics being determined therefrom.

The SLA correlation determination module 536 is configured to correlate the telemetry data for associated tenants. In other words, the SLA correlation determination module 536 is configured to perform a correlation analysis on the received telemetry data to determine which tenant(s) the telemetry data corresponds to. In some embodiments, the SLA correlation determination module 536 may be configured to tag, or otherwise include an indication with the telemetry data, that indicates to which tenant(s) the telemetry data corresponds.

The SLA report generation module 540, which may be embodied as hardware, firmware, software, virtualized hardware, emulated architecture, and/or a combination thereof as discussed above, is configured to analyze the performance metrics, generate an SLA report, and deliver the SLA report to a target computing device and/or component of the end-to-end SLA monitoring architecture 116. For example, the SLA report generation module 540 may be configured to analyze the performance metrics by comparing one or more of the performance metrics (e.g., as determined by the SLA telemetry data analysis module) against a corresponding performance benchmark (e.g., as determined from the SLA policy). Accordingly, the SLA report generation module 540 may be further configured to include results of the comparative analysis in the SLA report. In some embodiments, the SLA report generation module 540 may be configured to a sign and/or timestamp the SLA report prior to transmission. Further, the SLA report generation module 540 may be configured to securely transmit the SLA report to an OSS/BSS (e.g., the OSS/BSS 402 of FIG. 4) of the end-to-end SLA monitoring architecture 116 in which the NFV SLA controller 102 resides.

The SLA report may be usable by the receiving target computing device and/or component of the end-to-end SLA monitoring architecture 116 to monitor or otherwise detect interference between tenants, monitor performance of the end-to-end SLA monitoring architecture 116, determine headroom for improved network resource management (e.g., improved user experience, network efficiency, security, etc.), detect conditions where a hardware component is being significantly impacted (e.g., a processor is being starved of resources due to malicious attacks and/or software defects, monitor energy usage (e.g., for efficiency monitoring), etc.

Figure 6:
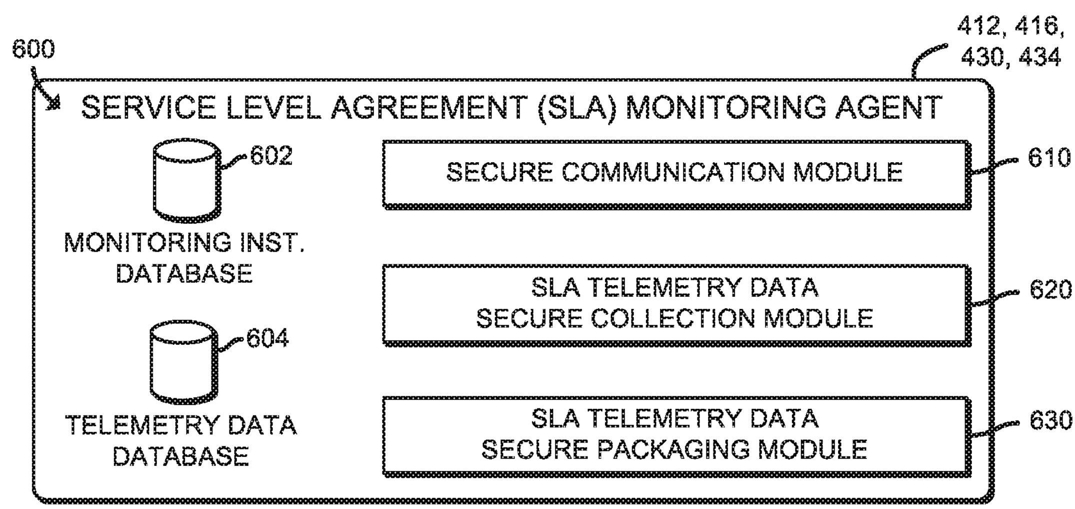
FIG. 6 is a simplified block diagram of at least one embodiment of an environment of one of the SLA monitoring agents of the end-to-end SLA monitoring architecture of the system of FIG. 1.

Referring now to FIG. 6, in an illustrative embodiment, one or more of the SLA agents (e.g., the SLA monitoring agent 412 of the VIM 106, the SLA monitoring agent 416 of the VNF manager 414, the SLA agents 430 of the VNF instances 420, the SLA monitoring agent 434 of the NFV infrastructure 108, etc.) establishes an environment 600 during operation. The illustrative environment 600 includes a secure communication module 610, an SLA telemetry data secure collection module 620, and an SLA telemetry data secure packaging module 630. The various modules of the environment 600 may be embodied as hardware, firmware, software, or a combination thereof. As such, in some embodiments, one or more of the modules of the environment 600 may be embodied as circuitry or collection of electrical devices (e.g., a secure communication circuit 610, an SLA telemetry data secure collection circuit 620, and an SLA telemetry data secure packaging circuit 630).

It should be appreciated that, in such embodiments, one or more of the secure communication circuit 610, the SLA telemetry data secure collection circuit 620, and the SLA telemetry data secure packaging circuit 630 may form a portion of one or more of a processor, I/O subsystem, communication circuitry, security engine, etc., of the network processing component on which the SLA agent resides (e.g., the processor 302, the I/O subsystem 306, the communication circuitry 318, the security engine 324, and/or one or more other components of one of the computing nodes 110). Additionally, in some embodiments, one or more of the illustrative modules may form a portion of another module and/or one or more of the illustrative modules may be independent of one another. Further, in some embodiments, one or more of the modules of the environment 600 may be embodied as virtualized hardware components or emulated architecture, which may be established and maintained by the processor or other components of the network processing component on which the SLA agent resides.

In the illustrative environment 600, the SLA agent further includes a monitoring instruction database 602 and a telemetry data database 604, each of which may be stored in the memory or data storage device of the network processing component on which the SLA agent resides (e.g., the memory 208 and/or the data storage device 214 of one of the computing nodes 110). Further, each of the monitoring instruction database 602 and the telemetry data database 604 may be accessed by the various modules and/or sub-modules of the SLA agent. Similar to the SLA policy database 404 and the SLA audit database 406 of FIG. 4, the monitoring instruction database 602 and the telemetry data database 604 are each secure databases. It should be appreciated that the SLA agent may include additional and/or alternative components, sub-components, modules, sub-modules, and/or devices commonly found in a computing device, which are not illustrated in FIG. 6 for clarity of the description.

The secure communication module 610, which may be embodied as hardware, firmware, software, virtualized hardware, emulated architecture, and/or a combination thereof as discussed above, similar to the secure communication module 510 of the illustrative NFV SLA controller 102 of FIG. 5, is configured to facilitate the secure transmission of data (e.g., messages, telemetry data, etc.) to and from the SLA agent. For example, the secure communication module 610 is configured to securely transmit telemetry data collected and packaged by the SLA agent via secure communication channels, such as by using protection credentials provided by the NFV SLA controller 102.

To securely manage the data transmissions, in some embodiments, the secure communication module 610 may receive a unique identifier of the SLA agent instance from the NFV SLA controller 102, as well as an authentication key. In such embodiments, the secure communication module 610 may perform various key management functions, cryptographic functions, secure communication channel management, and/or other security functions, such as using pairwise session keys that are refreshed periodically. Accordingly, the SLA agent can authenticate the messages received from the NFV SLA controller 102. Additionally, the secure communication module 610 is further configured to include an indication of origin, or an identifier of the SLA agent (e.g., the unique identifier) and/or an identifier of the network processing component of the end-to-end SLA monitoring architecture 116 on which the SLA agent resides (e.g., a unique identifier of the network processing component)

The SLA telemetry data secure collection module 620, which may be embodied as hardware, firmware, software, virtualized hardware, emulated architecture, and/or a combination thereof as discussed above, is configured to securely collect the telemetry data. To securely collect the telemetry data, the SLA telemetry data secure collection module 620 is configured to receive a set of monitoring instructions (e.g., based on an SLA policy) from the NFV SLA controller 102 indicating which types of telemetry data are to be collected by the SLA agent. In some embodiments, the monitoring instructions may be stored in the monitoring instruction database 602. The SLA telemetry data secure collection module 620 may be additionally configured to timestamp the collected telemetry data to indicate a time at which the telemetry data was collected.

As described previously, the telemetry data may include information relative to the network traffic processed at a particular network processing component on which the SLA monitoring agent resides, such as network packet behaviors including round-trip-times, jitter, throughput, latency, packet loss, etc. The telemetry data may additionally or alternatively include component-level configuration, operation, and/or policy data respective of the network processing component. For example, the telemetry data may include QoS metrics for memory, QoS metrics for cache, NIC queue metrics, switch queue metrics, platform reliability metrics, etc. In some embodiments, the collected data may be temporarily stored in the telemetry data database 604.

The SLA telemetry data secure packaging module 630, which may be embodied as hardware, firmware, software, virtualized hardware, emulated architecture, and/or a combination thereof as discussed above, is configured to securely package the collected telemetry data for secure transmission to the NFV SLA controller 102 for secure storage and analysis. The SLA telemetry data secure packaging module 630 may be additionally configured to timestamp the securely packaged telemetry data to indicate a time at which the telemetry data was packaged.

Figure 7:
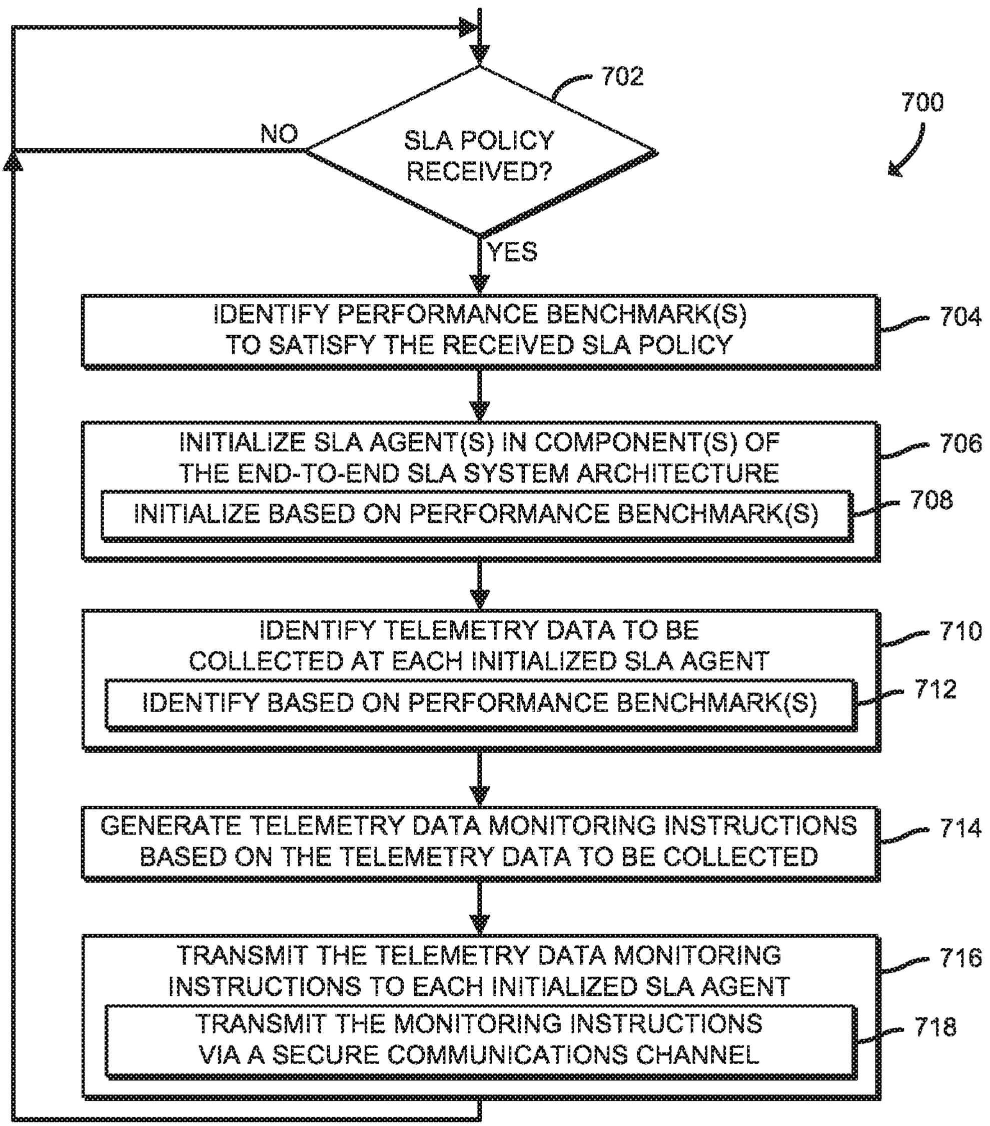
FIG. 7 is a simplified flow diagram of at least one embodiment of a method for initializing SLA monitoring of the end-to-end SLA monitoring architecture of the system of FIG. 1 that may be executed by the NFV security services controller of FIG. 5.

Referring now to FIG. 7, in use, an NFV SLA controller 102 (e.g., the NFV SLA controller 102 of FIG. 1) may execute a method 700 for initializing SLA monitoring of the end-to-end SLA monitoring architecture 116 via one or more SLA agents. The method 700 begins in block 702, in which the NFV SLA controller 102 determines whether an SLA policy (e.g., a new or updated SLA policy) has been received (i.e., whether to perform SLA monitoring). For example, in some embodiments, the SLA policy may be received from an OSS/BSS (e.g., the OSS/BSS 402 of FIG. 4). If the NFV SLA controller 102 determines the SLA policy has not been received, the method 700 loops back to block 702 in which the NFV SLA controller 102 continues to determine whether the SLA policy has been received; otherwise, the method 700 advances to block 704.

In block 704, the NFV SLA controller 102 identifies one or more performance benchmarks (i.e., one or more performance standards, thresholds, acceptable ranges, etc., set by an SLA from which the SLA policy has been derived) to satisfy the SLA policy received in block 702. As described previously, the received SLA policy may include one or more performance benchmarks, or otherwise include information usable to identify the performance benchmark(s). In block 706, the NFV SLA controller 102 initializes (e.g., instantiate, provision, configure, etc.) one or more SLA agents in one or more components of the end-to-end SLA monitoring architecture 116 (see, e.g., the SLA agents of FIG. 4).

For example, in block 708, the NFV SLA controller 102 initializes the SLA agent(s) based on the performance benchmarks identified in block 704. In other words, the NFV SLA controller 102 determines which SLA agents are to be initialized in which of the network processing components of the end-to-end SLA monitoring architecture 116 in order to satisfy the SLA policy and the associated performance benchmark(s). It should be appreciated that the NFV SLA controller 102 manages the initialization of the SLA agents (i.e., other components of the end-to-end SLA monitoring architecture 116 are responsible for the initialization of the SLA agents based on instruction received from the NFV SLA controller 102).

In block 710, the NFV SLA controller 102 identifies the telemetry data (e.g., type(s) of telemetry data) to be collected at each SLA agent initialized in block 706. As also described previously, the telemetry data may include information relative to the network traffic processed at a particular network processing component on which the SLA monitoring agent resides (e.g., round-trip-times, jitter, throughput, latency, packet loss, etc.), as well as component-level configuration, operation, and/or policy data respective of the network processing component (e.g., QoS metrics for memory, QoS metrics for cache, NIC queue metrics, switch queue metrics, platform reliability metrics, etc.). In block 712, the NFV SLA controller 102 identifies the telemetry data to be collected based on one or more of the performance benchmarks identified in block 704.

In block 714, the NFV SLA controller 102 generates telemetry data monitoring instructions usable by the initialized SLA agents to collect telemetry data (i.e., the telemetry data identified to be collected in block 710). Accordingly, the telemetry data monitoring instructions may include a type of telemetry data to be collected, identifying information of the NFV SLA controller 102, and/or any other information usable by the initialized SLA agents to collect the applicable telemetry data. In block 716, the NFV SLA controller 102 transmits the telemetry data monitoring instructions generated in block 714. In block 718, the NFV SLA controller 102 transmits the telemetry data monitoring instructions via a secure communication channel between the NFV SLA controller 102 and the SLA agents, as well as the network processing components therebetween.

Figure 8:
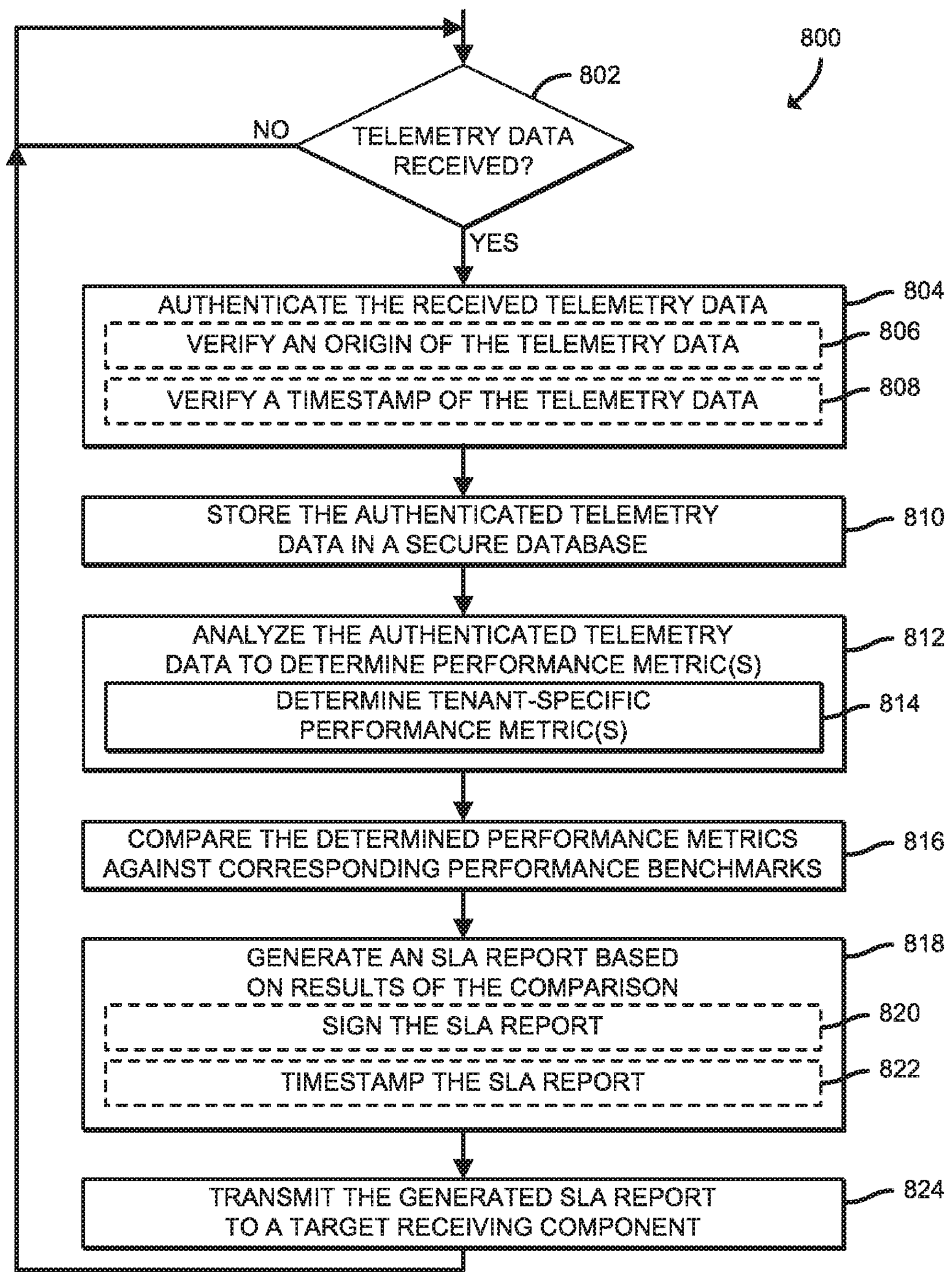
FIG. 8 is a simplified flow diagram of at least one embodiment of a method for SLA monitoring of the end-to-end SLA monitoring architecture of the system of FIG. 1 via one or more of the SLA monitoring agents that may be executed by the NFV security services controller of FIG. 5.

Referring now to FIG. 8, in use, an NFV SLA controller 102 (e.g., the NFV SLA controller 102 of FIG. 1) may execute a method 800 for SLA monitoring of the end-to-end SLA monitoring architecture 116 via one or more SLA agents. The method 800 begins in block 802, in which the NFV SLA controller 102 determines whether telemetry data has been securely received. If not, the method 800 loops back to block 802 to continue to determine whether telemetry data has been securely received; otherwise, the method 800 advances to block 804.

In block 804, the NFV SLA controller 102 authenticates the received telemetry data (e.g., audits the telemetry data). To do so, in some embodiments, in block 806, the NFV SLA controller 102 may verify an origin of the telemetry data, such as an identifier of the SLA agent and/or an identifier of the network processing component on which the SLA agent resides. Additionally or alternatively, in some embodiments, in block 808, the NFV SLA controller 102 may verify a timestamp received with the telemetry data. In block 810, the NFV SLA controller 102 stores the authenticated telemetry data in a secure database (e.g., the SLA audit database 406 of FIG. 4). It should be appreciated that, in some embodiments, the received telemetry data may be stored prior to the audit being performed in block 804, in which case the stored data may be as of yet authenticated.

In block 812, the NFV SLA controller 102 analyzes the authenticated telemetry data to determine one or more performance metrics. As described previously, the performance metrics may include any network data and/or network processing measurements usable to identify one or more performance levels of the end-to-end SLA monitoring architecture 116, such as application response time, usage statistics, resource utilization metric, etc. In some embodiments, in block 814, the NFV SLA controller 102 analyzes the authenticated telemetry data to determine one or more performance metrics on a per-tenant basis. In other words, the performance metrics may be based on telemetry data received or otherwise filtered to isolate a particular tenant (e.g., to support out-of-band SLA monitoring).

In block 816, the NFV SLA controller 102 compares the performance metrics determined in block 812 to corresponding performance benchmarks received in or otherwise determined from a received SLA policy (see, e.g. block 710 of the method 700 of FIG. 7). In block 818, the NFV SLA controller 102 generates an SLA report based on results of the comparison performed in block 816. Additionally, in some embodiments, in block 820, the NFV SLA controller 102 signs the SLA report (e.g., usable to validate the source of the SLA report). Additionally or alternatively, in some embodiments, in block 822, the NFV SLA controller 102 timestamps the SLA report (e.g., usable to validate a time at which the SLA report was generated). In block 824, the NFV SLA controller 102 transmits the SLA report generated in block 818 to a target receiving component (e.g., the OSS/BSS 402, another controller device, etc.) of the end-to-end SLA monitoring architecture 116.

It should be appreciated that at least a portion of the methods 700 and 800 may be embodied as various instructions stored on a computer-readable media, which may be executed by the processor 202, the communication circuitry 218, and/or other components of the NFV SLA controller 102 to cause the NFV SLA controller 102 to perform the methods 700 and 800. The computer-readable media may be embodied as any type of media capable of being read by the NFV SLA controller 102 including, but not limited to, the memory 208, the data storage device 214, a local memory (not shown) of the NIC 220 of the communication circuitry 218, other memory or data storage devices of the NFV SLA controller 102, portable media readable by a peripheral device of the NFV SLA controller 102, and/or other media.

Figure 9:
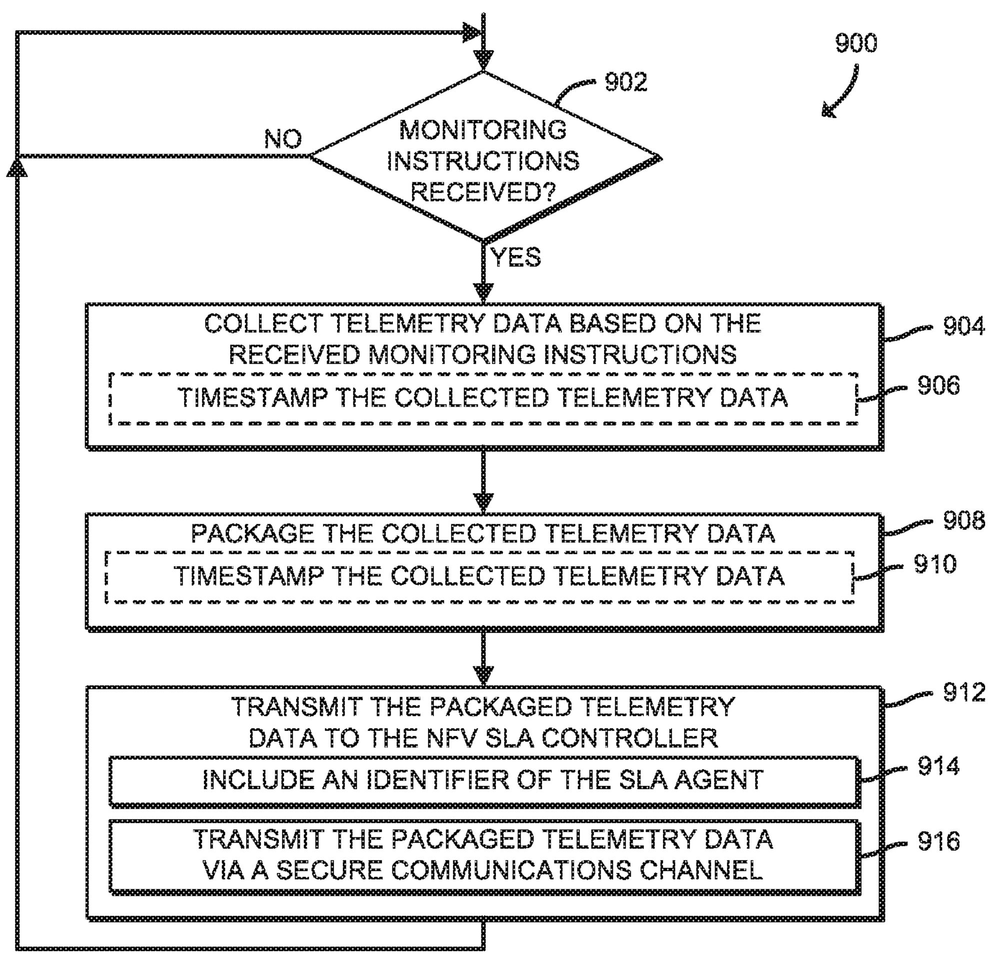
FIG. 9 is a simplified flow diagram of at least one embodiment of a method for SLA monitoring of the end-to-end SLA monitoring architecture of the system of FIG. 1 that may be executed by one of the SLA monitoring agents.

Referring now to FIG. 9, in use, an SLA agent (e.g., an initialized one of the SLA agents of FIG. 4) may execute a method 900 for SLA monitoring of the end-to-end SLA monitoring architecture 116. As described previously, the SLA monitoring executed by the SLA agents is performed in a secure environment (e.g., a TEE). The method 900 begins in block 902, in which the SLA agent determines whether SLA monitoring instructions have been received. If not, the method 900 loops back to block 902 to continue to determine whether the SLA monitoring instructions have been received; otherwise, the method 900 advances to block 904.

In block 904, the SLA agent securely collects telemetry data based on the monitoring instructions received in block 902. Additionally, in some embodiments, in block 906, the SLA agent timestamps the telemetry data as it is collected. In block 908, the SLA agent securely packages the telemetry data collected in block 904. Additionally, in some embodiments, the SLA agent timestamps the packaged telemetry data. In block 912, the SLA agent transmits the packaged telemetry data to an NFV SLA controller (e.g., the NFV SLA controller 102 of FIG. 4). In block 914, the SLA agent additionally transmits an identifier of the SLA agent (e.g., a unique identifier that identifies the SLA agent and the telemetry data transmitted therefrom). Additionally, in block 916, the SLA agent transmits the packaged telemetry data via a secure communication channel between the SLA agent, the network processing component on which the SLA agent has been instantiated, and the NFV SLA controller 102.

It should be appreciated that at least a portion of the method 900 may be embodied as various instructions stored on a computer-readable media, which may be executed by the processor, the communication circuitry, and/or other components of the network processing component on which the SLA agent resides to cause the SLA agent to perform the method 900. In an illustrative example, the SLA monitoring agent 434 may execute the various instructions stored on a computer-readable media by the processor 302, the I/O subsystem 306, the communication circuitry 318, the security engine 324, and/or one or more other components of one of the computing nodes 110. The computer-readable media may be embodied as any type of media capable of being read by the SLA agent and/or the network processing component on which the SLA agent resides including, but not limited to, the memory, the data storage device, a local memory of the NIC, other memory or data storage devices of the SLA agent, portable media readable by a peripheral device of the SLA agent, and/or other media.

EXAMPLES

Illustrative examples of the technologies disclosed herein are provided below. An embodiment of the technologies may include any one or more, and any combination of, the examples described below.

Example 1 includes a network functions virtualization (NFV) service level agreement (SLA) controller for monitoring SLA performance in an end-to-end SLA monitoring architecture that includes the NFV SLA controller, the NFV SLA controller comprising one or more processors; and one or more memory devices having stored therein a plurality of instructions that, when executed by the one or more processors, cause the NFV SLA controller to manage an initialization of a plurality of SLA agents in one or more network processing components of the end-to-end SLA monitoring architecture based on an SLA policy, wherein the SLA policy identifies one or more performance benchmarks, and wherein each of the one or more performance benchmarks indicate an expected quality of service level associated with processing network traffic through the end-to-end SLA monitoring architecture; provide telemetry data monitoring instructions to each of the initialized SLA agents based on the one or more performance benchmarks, wherein the generated telemetry data monitoring instructions are usable to determine which types of telemetry data to monitor; receive telemetry data from each of the initialized SLA agents based on the provided telemetry data monitoring instructions; analyze, by an SLA analysis engine in a trusted execution environment (TEE) of the NFV SLA controller, the received telemetry data; determine, by the SLA analysis engine, one or more performance metrics based on the analysis, wherein the one or more determined performance metrics identify measurable characteristics of the received telemetry data; compare one or more of the performance benchmarks to a corresponding one or more of the determined performance metrics; generate an SLA report that includes results of the comparison of the performance benchmarks and the determined performance metrics; and transmit the generated SLA report to a target receiving component of the end-to-end SLA monitoring architecture.

Example 2 includes the subject matter of Example 1, and wherein the plurality of instructions further cause the NFV SLA controller to identify one or more types of telemetry data to be collected at each of the initialized SLA agents based on the one or more performance benchmarks; and include the identified one or more types of telemetry data with the telemetry data monitoring instructions, wherein to provide the telemetry data monitoring instructions to each of the initialized SLA agents comprises to provide the generated telemetry data monitoring instructions with the one or more types of telemetry data.

Example 3 includes the subject matter of any of Examples 1 and 2, and wherein to initialize the plurality of SLA agents in the one or more network processing components of the end-to-end SLA monitoring architecture comprises to initialize one or more SLA agents in one or more virtual network functions presently being executed in a computing node of the end-to-end SLA monitoring architecture.

Example 4 includes the subject matter of any of Examples 1-3, and wherein to initialize the plurality of SLA agents in the one or more network processing components of the end-to-end SLA monitoring architecture comprises to initialize one or more SLA agents in one or more computing nodes of the end-to-end SLA monitoring architecture.

Example 5 includes the subject matter of any of Examples 1-4, and wherein to initialize the plurality of SLA agents in the one or more network processing components of the end-to-end SLA monitoring architecture comprises to initialize one or more SLA agents in a virtual infrastructure manager of the end-to-end SLA monitoring architecture.

Example 6 includes the subject matter of any of Examples 1-5, and wherein to initialize the plurality of SLA agents in the one or more network processing components of the end-to-end SLA monitoring architecture comprises to initialize one or more SLA agents in a TEE of an NFV infrastructure of the end-to-end SLA monitoring architecture.

Example 7 includes the subject matter of any of Examples 1-6, and wherein to receive the telemetry data from each of the initialized SLA agents comprises to receive the telemetry data via a secure communication channel between the NFV SLA controller and each of the initialized SLA agents.

Example 8 includes the subject matter of any of Examples 1-7, and wherein to provide the generated telemetry data monitoring instructions to each of the initialized SLA agents comprises to provide the generated telemetry data monitoring instructions via a secure communication channel between the NFV SLA controller and each of the initialized SLA agents.

Example 9 includes the subject matter of any of Examples 1-8, and wherein the plurality of instructions further cause the NFV SLA controller to authenticate the received telemetry data to verify an authenticity of the received telemetry data; and store the authenticated received telemetry data in a secure database.

Example 10 includes the subject matter of any of Examples 1-9, and wherein to authenticate the received telemetry data comprises to verify an origin of the telemetry data.

Example 11 includes the subject matter of any of Examples 1-10, and wherein to authenticate the received telemetry data comprises to verify a timestamp of the telemetry data.

Example 12 includes the subject matter of any of Examples 1-11, and wherein to receive the telemetry data comprises to receive at least one of a network packet behavior or network processing component related information.

Example 13 includes the subject matter of any of Examples 1-12, and wherein the network packet behavior includes at least one of a round-trip-time, jitter information, throughput information, latency information, or packet loss information.

Example 14 includes the subject matter of any of Examples 1-13, and wherein the network processing component related information includes at least one of component-level configuration data, operation data of the network processing component, or utilization data of the network processing component.

Example 15 includes the subject matter of any of Examples 1-14, and wherein the network processing component related information includes at least one of quality of service (QoS) metrics for memory, QoS metrics for cache, network interface controller queue utilization metrics, switch queue utilization metrics, or platform reliability metrics.

Example 16 includes the subject matter of any of Examples 1-15, and wherein to determine the one or more performance metrics comprises to determine at least one of a quality of service level, an application response time, a usage statistic, or a resource utilization metric.

Example 17 includes the subject matter of any of Examples 1-16, and wherein to analyze the received telemetry data to determine the one or more performance metrics comprises to analyze the received telemetry data to determine the one or more performance metrics specific to one or more tenants of the end-to-end SLA monitoring architecture.

Example 18 includes the subject matter of any of Examples 1-17, and wherein the plurality of instructions further cause the NFV SLA controller to sign the generated SLA report prior to transmission.

Example 19 includes the subject matter of any of Examples 1-18, and wherein the plurality of instructions further cause the NFV SLA controller to timestamp the generated SLA report prior to transmission.

Example 20 includes the subject matter of any of Examples 1-19, and wherein to transmit the generated SLA report to the target receiving component of the end-to-end SLA monitoring architecture comprises to transmit the generated SLA report to an operations support systems and business support systems (OSS/BSS) of the end-to-end SLA monitoring architecture.

Example 21 includes a network functions virtualization (NFV) service level agreement (SLA) controller for monitoring SLA performance in an end-to-end SLA monitoring architecture that includes the NFV SLA controller, the NFV SLA controller comprising an SLA telemetry data monitoring circuit to (i) manage an initialization of a plurality of SLA agents in one or more network processing components of the end-to-end SLA monitoring architecture based on an SLA policy, wherein the SLA policy identifies one or more performance benchmarks, and wherein each of the one or more performance benchmarks indicate an expected quality of service level associated with processing network traffic through the end-to-end SLA monitoring architecture and (ii) provide telemetry data monitoring instructions to each of the initialized SLA agents based on the one or more performance benchmarks, wherein the generated telemetry data monitoring instructions are usable to determine which types of telemetry data to monitor; an SLA telemetry data analysis circuit to (i) receive telemetry data from each of the initialized SLA agents based on the provided telemetry data monitoring instructions, (ii) analyze, by an SLA analysis engine in a trusted execution environment (TEE) of the NFV SLA controller, the received telemetry data, (iii) determine one or more performance metrics based on the analysis, wherein the one or more determined performance metrics identify measurable characteristics of the received telemetry data, and (iv) compare one or more of the performance benchmarks to a corresponding one or more of the determined performance metrics; an SLA report generation circuit to generate an SLA report that includes a result of the comparison of the performance benchmarks and the determined performance metrics; and a secure communication circuit to transmit the generated SLA report to a target receiving component of the end-to-end SLA monitoring architecture.

Example 22 includes the subject matter of Example 21, and wherein the SLA telemetry data monitoring circuit is further to identify one or more types of telemetry data to be collected at each of the initialized SLA agents based on the one or more performance benchmarks; and include the identified one or more types of telemetry data with the telemetry data monitoring instructions, wherein to provide the telemetry data monitoring instructions to each of the initialized SLA agents comprises to provide the generated telemetry data monitoring instructions with the one or more types of telemetry data.

Example 23 includes the subject matter of any of Examples 21 and 22, and wherein to initialize the plurality of SLA agents in the one or more network processing components of the end-to-end SLA monitoring architecture comprises to initialize one or more SLA agents in one or more virtual network functions presently being executed in a computing node of the end-to-end SLA monitoring architecture.

Example 24 includes the subject matter of any of Examples 21-23, and wherein to initialize the plurality of SLA agents in the one or more network processing components of the end-to-end SLA monitoring architecture comprises to initialize one or more SLA agents in one or more computing nodes of the end-to-end SLA monitoring architecture.

Example 25 includes the subject matter of any of Examples 21-24, and wherein to initialize the plurality of SLA agents in the one or more network processing components of the end-to-end SLA monitoring architecture comprises to initialize one or more SLA agents in a virtual infrastructure manager of the end-to-end SLA monitoring architecture.

Example 26 includes the subject matter of any of Examples 21-25, and wherein to initialize the plurality of SLA agents in the one or more network processing components of the end-to-end SLA monitoring architecture comprises to initialize one or more SLA agents in a TEE of an NFV infrastructure of the end-to-end SLA monitoring architecture.

Example 27 includes the subject matter of any of Examples 21-26, and wherein to receive the telemetry data from each of the initialized SLA agents comprises to receive the telemetry data via a secure communication channel between the NFV SLA controller and each of the initialized SLA agents.

Example 28 includes the subject matter of any of Examples 21-27, and wherein to provide the generated telemetry data monitoring instructions to each of the initialized SLA agents comprises to provide the generated telemetry data monitoring instructions via a secure communication channel between the NFV SLA controller and each of the initialized SLA agents.

Example 29 includes the subject matter of any of Examples 21-28, and wherein the SLA telemetry data analysis circuit is further to authenticate the received telemetry data to verify an authenticity of the received telemetry data; and store the authenticated received telemetry data in a secure database.

Example 30 includes the subject matter of any of Examples 21-29, and wherein to authenticate the received telemetry data comprises to verify an origin of the telemetry data.

Example 31 includes the subject matter of any of Examples 21-30, and wherein to authenticate the received telemetry data comprises to verify a timestamp of the telemetry data.

Example 32 includes the subject matter of any of Examples 21-31, and wherein to receive the telemetry data comprises to receive at least one of a network packet behavior or network processing component related information.

Example 33 includes the subject matter of any of Examples 21-32, and wherein the network packet behavior includes at least one of a round-trip-time, jitter information, throughput information, latency information, or packet loss information.

Example 34 includes the subject matter of any of Examples 21-33, and wherein the network processing component related information includes at least one of component-level configuration data, operation data of the network processing component, or utilization data of the network processing component.

Example 35 includes the subject matter of any of Examples 21-34, and wherein the network processing component related information includes at least one of quality of service (QoS) metrics for memory, QoS metrics for cache, network interface controller queue utilization metrics, switch queue utilization metrics, or platform reliability metrics.

Example 36 includes the subject matter of any of Examples 21-35, and wherein to determine the one or more performance metrics comprises to determine at least one of a quality of service level, an application response time, a usage statistic, or a resource utilization metric.

Example 37 includes the subject matter of any of Examples 21-36, and wherein to analyze the received telemetry data comprises to analyze the received telemetry data to determine the one or more performance metrics specific to one or more tenants of the end-to-end SLA monitoring architecture.

Example 38 includes the subject matter of any of Examples 21-37, and wherein the SLA report generation circuit is further to sign the generated SLA report prior to transmission.

Example 39 includes the subject matter of any of Examples 21-38, and wherein the SLA report generation circuit is further to timestamp the generated SLA report prior to transmission.

Example 40 includes the subject matter of any of Examples 21-39, and wherein to transmit the generated SLA report to the target receiving component of the end-to-end SLA monitoring architecture comprises to transmit the generated SLA report to an operations support systems and business support systems (OSS/BSS) of the end-to-end SLA monitoring architecture.

Example 41 includes a method for monitoring service level agreement (SLA) performance in an end-to-end SLA monitoring architecture, the method comprising managing, by a network functions virtualization (NFV) SLA controller, an initialization of a plurality of SLA agents in one or more network processing components of the end-to-end SLA monitoring architecture based on an SLA policy, wherein the SLA policy identifies one or more performance benchmarks, and wherein each of the one or more performance benchmarks indicate an expected quality of service level associated with processing network traffic through the end-to-end SLA monitoring architecture; providing, by the NFV SLA controller, telemetry data monitoring instructions to each of the initialized SLA agents based on the one or more performance benchmarks, wherein the generated telemetry data monitoring instructions are usable to determine which types of telemetry data to monitor; receiving, by the NFV SLA controller, telemetry data from each of the initialized SLA agents based on the provided telemetry data monitoring instructions; analyzing, by an SLA analysis engine in a trusted execution environment (TEE) of the NFV SLA controller, the received telemetry data; determining, by the SLA analysis engine, one or more performance metrics based on the analysis, wherein the one or more determined performance metrics identify measurable characteristics of the received telemetry data; comparing, by the NFV SLA controller, one or more of the performance benchmarks to a corresponding one or more of the determined performance metrics; generating, by the NFV SLA controller, an SLA report that includes results of the comparison of the performance benchmarks and the determined performance metrics; and transmitting, by the NFV SLA controller, the generated SLA report to a target receiving component of the end-to-end SLA monitoring architecture.

Example 42 includes the subject matter of Example 41, and further including identifying, by the NFV SLA controller, one or more types of telemetry data to be collected at each of the initialized SLA agents based on the one or more performance benchmarks; and including, by the NFV SLA controller, the identified one or more types of telemetry data with the telemetry data monitoring instructions, wherein providing the telemetry data monitoring instructions to each of the initialized SLA agents comprises providing the generated telemetry data monitoring instructions with the one or more types of telemetry data.

Example 43 includes the subject matter of any of Examples 41 and 42, and wherein initializing the plurality of SLA agents in the one or more network processing components of the end-to-end SLA monitoring architecture comprises initializing one or more SLA agents in one or more virtual network functions presently being executed in a computing node of the end-to-end SLA monitoring architecture.

Example 44 includes the subject matter of any of Examples 41-43, and wherein initializing the plurality of SLA agents in the one or more network processing components of the end-to-end SLA monitoring architecture comprises initializing one or more SLA agents in one or more computing nodes of the end-to-end SLA monitoring architecture.

Example 45 includes the subject matter of any of Examples 41-44, and wherein initializing the plurality of SLA agents in the one or more network processing components of the end-to-end SLA monitoring architecture comprises initializing one or more SLA agents in a virtual infrastructure manager of the end-to-end SLA monitoring architecture.

Example 46 includes the subject matter of any of Examples 41-45, and wherein initializing the plurality of SLA agents in the one or more network processing components of the end-to-end SLA monitoring architecture comprises initializing one or more SLA agents in a TEE of an NFV infrastructure of the end-to-end SLA monitoring architecture.

Example 47 includes the subject matter of any of Examples 41-46, and wherein receiving the telemetry data from each of the initialized SLA agents comprises receiving the telemetry data via a secure communication channel between the NFV SLA controller and each of the initialized SLA agents.

Example 48 includes the subject matter of any of Examples 41-47, and wherein providing the generated telemetry data monitoring instructions to each of the initialized SLA agents comprises providing the generated telemetry data monitoring instructions via a secure communication channel between the NFV SLA controller and each of the initialized SLA agents.

Example 49 includes the subject matter of any of Examples 41-48, and further including authenticating, by the NFV SLA controller, the received telemetry data to verify an authenticity of the received telemetry data; and storing, by the NFV SLA controller, the authenticated received telemetry data in a secure database.

Example 50 includes the subject matter of any of Examples 41-49, and wherein authenticating the received telemetry data comprises verifying an origin of the telemetry data.

Example 51 includes the subject matter of any of Examples 41-50, and wherein authenticating the received telemetry data comprises verifying a timestamp of the telemetry data.

Example 52 includes the subject matter of any of Examples 41-51, and wherein receiving the telemetry data comprises receiving at least one of a network packet behavior or network processing component related information.

Example 53 includes the subject matter of any of Examples 41-52, and wherein the network packet behavior includes at least one of a round-trip-time, jitter information, throughput information, latency information, or packet loss information.

Example 54 includes the subject matter of any of Examples 41-53, and wherein the network processing component related information includes at least one of component-level configuration data, operation data of the network processing component, or utilization data of the network processing component.

Example 55 includes the subject matter of any of Examples 41-54, and wherein the network processing component related information includes at least one of quality of service (QoS) metrics for memory, QoS metrics for cache, network interface controller queue utilization metrics, switch queue utilization metrics, or platform reliability metrics.

Example 56 includes the subject matter of any of Examples 41-55, and wherein determining the one or more performance metrics comprises determining at least one of a quality of service level, an application response time, a usage statistic, or a resource utilization metric.

Example 57 includes the subject matter of any of Examples 41-56, and wherein analyzing the received telemetry data metrics comprises analyzing the received telemetry data to determine the one or more performance metrics specific to one or more tenants of the end-to-end SLA monitoring architecture.

Example 58 includes the subject matter of any of Examples 41-57, and further including signing, by the NFV SLA controller, the generated SLA report prior to transmission.

Example 59 includes the subject matter of any of Examples 41-48, and further including timestamping, by the NFV SLA controller, the generated SLA report prior to transmission.

Example 60 includes the subject matter of any of Examples 41-59, and wherein transmitting the generated SLA report to the target receiving component of the end-to-end SLA monitoring architecture comprises transmitting the generated SLA report to an operations support systems and business support systems (OSS/BSS) of the end-to-end SLA monitoring architecture.

Example 61 includes a network functions virtualization (NFV) service level agreement (SLA) controller comprising a processor; and a memory having stored therein a plurality of instructions that when executed by the processor cause the NFV SLA controller to perform the method of any of Examples 21-40.

Example 62 includes one or more machine readable storage media comprising a plurality of instructions stored thereon that in response to being executed result in a network functions virtualization (NFV) service level agreement (SLA) controller performing the method of any of Examples 21-40.

Example 63 includes a network functions virtualization (NFV) service level agreement (SLA) controller for monitoring SLA performance in an end-to-end SLA monitoring architecture that includes the NFV SLA controller, the NFV SLA controller comprising means for managing an initialization of a plurality of SLA agents in one or more network processing components of the end-to-end SLA monitoring architecture based on an SLA policy, wherein the SLA policy identifies one or more performance benchmarks, and wherein each of the one or more performance benchmarks indicate an expected quality of service level associated with processing network traffic through the end-to-end SLA monitoring architecture; means for providing telemetry data monitoring instructions to each of the initialized SLA agents based on the one or more performance benchmarks, wherein the generated telemetry data monitoring instructions are usable to determine which types of telemetry data to monitor; means for receiving telemetry data from each of the initialized SLA agents based on the provided telemetry data monitoring instructions; means for analyzing, in a trusted execution environment (TEE) of the NFV SLA controller, the received telemetry data; means for determining one or more performance metrics based on the analysis, wherein the one or more determined performance metrics identify measurable characteristics of the received telemetry data; means for comparing one or more of the performance benchmarks to a corresponding one or more of the determined performance metrics; and an SLA report generation circuit to (i) generate an SLA report that includes results of the comparison of the performance benchmarks and the determined performance metrics and (ii) transmit the generated SLA report to a target receiving component of the end-to-end SLA monitoring architecture.

Example 64 includes the subject matter of Example 63, and further including means for identifying one or more types of telemetry data to be collected at each of the initialized SLA agents based on the one or more performance benchmarks; and means for including the identified one or more types of telemetry data with the telemetry data monitoring instructions, wherein the means for providing the telemetry data monitoring instructions to each of the initialized SLA agents comprises means for providing the generated telemetry data monitoring instructions with the one or more types of telemetry data.

Example 65 includes the subject matter of any of Examples 63 and 64, and wherein the means for initializing the plurality of SLA agents in the one or more network processing components of the end-to-end SLA monitoring architecture comprises means for initializing one or more SLA agents in one or more virtual network functions presently being executed in a computing node of the end-to-end SLA monitoring architecture.

Example 66 includes the subject matter of any of Examples 63-65, and wherein the means for initializing the plurality of SLA agents in the one or more network processing components of the end-to-end SLA monitoring architecture comprises means for initializing one or more SLA agents in one or more computing nodes of the end-to-end SLA monitoring architecture.

Example 67 includes the subject matter of any of Examples 63-66, and wherein the means for initializing the plurality of SLA agents in the one or more network processing components of the end-to-end SLA monitoring architecture comprises means for initializing one or more SLA agents in a virtual infrastructure manager of the end-to-end SLA monitoring architecture.

Example 68 includes the subject matter of any of Examples 63-67, and wherein the means for initializing the plurality of SLA agents in the one or more network processing components of the end-to-end SLA monitoring architecture comprises means for initializing one or more SLA agents in a TEE of an NFV infrastructure of the end-to-end SLA monitoring architecture.

Example 69 includes the subject matter of any of Examples 63-68, and wherein the means for receiving the telemetry data from each of the initialized SLA agents comprises means for receiving the telemetry data via a secure communication channel between the NFV SLA controller and each of the initialized SLA agents.

Example 70 includes the subject matter of any of Examples 63-69, and wherein the means for providing the generated telemetry data monitoring instructions to each of the initialized SLA agents comprises means for providing the generated telemetry data monitoring instructions via a secure communication channel between the NFV SLA controller and each of the initialized SLA agents.

Example 71 includes the subject matter of any of Examples 63-70, and further including means for authenticating the received telemetry data to verify an authenticity of the received telemetry data; and means for storing the authenticated received telemetry data in a secure database.

Example 72 includes the subject matter of any of Examples 63-71, and wherein the means for authenticating the received telemetry data comprises means for verifying an origin of the telemetry data.

Example 73 includes the subject matter of any of Examples 63-72, and wherein the means for authenticating the received telemetry data comprises means for verifying a timestamp of the telemetry data.

Example 74 includes the subject matter of any of Examples 63-73, and wherein the means for receiving the telemetry data comprises means for receiving at least one of a network packet behavior or network processing component related information.

Example 75 includes the subject matter of any of Examples 63-74, and wherein the network packet behavior includes at least one of a round-trip-time, jitter information, throughput information, latency information, or packet loss information.

Example 76 includes the subject matter of any of Examples 63-75, and wherein the network processing component related information includes at least one of component-level configuration data, operation data of the network processing component, or utilization data of the network processing component.

Example 77 includes the subject matter of any of Examples 63-76, and wherein the network processing component related information includes at least one of quality of service (QoS) metrics for memory, QoS metrics for cache, network interface controller queue utilization metrics, switch queue utilization metrics, or platform reliability metrics.

Example 78 includes the subject matter of any of Examples 63-77, and wherein to determine the one or more performance metrics comprises to determine at least one of a quality of service level, an application response time, a usage statistic, or a resource utilization metric.

Example 79 includes the subject matter of any of Examples 63-78, and wherein the means for analyzing the received telemetry data comprises means for analyzing the received telemetry data to determine the one or more performance metrics specific to one or more tenants of the end-to-end SLA monitoring architecture.

Example 80 includes the subject matter of any of Examples 63-79, and wherein the SLA report generation circuit is further to sign the generated SLA report prior to transmission.

Example 81 includes the subject matter of any of Examples 63-80, and wherein the SLA report generation circuit is further to timestamp the generated SLA report prior to transmission.

Example 82 includes the subject matter of any of Examples 63-81, and wherein to transmit the generated SLA report to the target receiving component of the end-to-end SLA monitoring architecture comprises to transmit the generated SLA report to an operations support systems and business support systems (OSS/BSS) of the end-to-end SLA monitoring architecture.

Example 83 includes a service level agreement (SLA) agent for monitoring SLA performance in an end-to-end SLA monitoring architecture that includes the SLA agent, the SLA agent comprising one or more processors; and one or more memory devices having stored therein a plurality of instructions that, when executed by the one or more processors, cause the SLA agent to securely receive telemetry data monitoring instructions from a network functions virtualization (NFV) SLA controller, wherein the telemetry data monitoring instructions indicate types of telemetry data to be collected based on an SLA policy; securely collect the telemetry data based on the received telemetry data monitoring instructions; securely package the collected telemetry data; and securely transmit the packaged telemetry data to the NFV SLA controller.

Example 84 includes the subject matter of Example 83, and wherein to securely collect the telemetry data comprises to securely collect at least one of a network packet behavior or information related to a network processing component on which the SLA agent has been initialized.

Example 85 includes the subject matter of any of Examples 83 and 84, and wherein the network packet behavior includes at least one of a round-trip-time, jitter information, throughput information, latency information, or packet loss information.

Example 86 includes the subject matter of any of Examples 83-85, and wherein the information related to the network processing component includes at least one of component-level configuration data, operation data of the network processing component, or utilization data of the network processing component.

Example 87 includes the subject matter of any of Examples 83-86, and wherein the information related to the network processing component includes at least one of quality of service (QoS) metrics for memory, QoS metrics for cache, network interface controller queue utilization metrics, switch queue utilization metrics, or platform reliability metrics.

Example 88 includes the subject matter of any of Examples 83-87, and wherein to securely receive the telemetry data monitoring instructions from the NFV SLA controller comprises to securely receive the telemetry data monitoring instructions via a secure communication channel.

Example 89 includes the subject matter of any of Examples 83-88, and wherein to securely transmit the packaged telemetry data to the NFV SLA controller comprises to securely transmit the packaged telemetry data via a secure communication channel.

Example 90 includes the subject matter of any of Examples 83-89, and wherein to securely collect the telemetry data further comprises to timestamp the collected telemetry data.

Example 91 includes the subject matter of any of Examples 83-90, and wherein to securely package the collected telemetry data further comprises to timestamp the packaged telemetry data.

Example 92 includes the subject matter of any of Examples 83-91, and wherein to securely transmit the packaged telemetry data to the NFV SLA controller comprises to include an identifier of the SLA agent with the packaged telemetry data.

Example 93 includes a service level agreement (SLA) agent for monitoring SLA performance in an end-to-end SLA monitoring architecture that includes the SLA agent, the SLA agent comprising a secure communication circuit to securely receive telemetry data monitoring instructions from a network functions virtualization (NFV) SLA controller, wherein the telemetry data monitoring instructions indicate types of telemetry data to be collected based on an SLA policy; an SLA telemetry data secure collection circuit to securely collect the telemetry data based on the received telemetry data monitoring instructions; and an SLA telemetry data secure packaging circuit to (i) securely package the collected telemetry data and (ii) securely transmit the packaged telemetry data to the NFV SLA controller.

Example 94 includes the subject matter of Example 93, and wherein to securely collect the telemetry data comprises to securely collect at least one of a network packet behavior or information related to a network processing component on which the SLA agent has been initialized.

Example 95 includes the subject matter of any of Examples 93 and 94, and wherein the network packet behavior includes at least one of a round-trip-time, jitter information, throughput information, latency information, or packet loss information.

Example 96 includes the subject matter of any of Examples 93-95, and wherein the information related to the network processing component includes at least one of component-level configuration data, operation data of the network processing component, or utilization data of the network processing component.

Example 97 includes the subject matter of any of Examples 93-96, and wherein the information related to the network processing component includes at least one of quality of service (QoS) metrics for memory, QoS metrics for cache, network interface controller queue utilization metrics, switch queue utilization metrics, or platform reliability metrics.

Example 98 includes the subject matter of any of Examples 93-97, and wherein to securely receive the telemetry data monitoring instructions from the NFV SLA controller comprises to securely receive the telemetry data monitoring instructions via a secure communication channel.

Example 99 includes the subject matter of any of Examples 93-98, and wherein to securely transmit the packaged telemetry data to the NFV SLA controller comprises to securely transmit the packaged telemetry data via a secure communication channel.

Example 100 includes the subject matter of any of Examples 93-99, and wherein to securely collect the telemetry data further comprises to timestamp the collected telemetry data.

Example 101 includes the subject matter of any of Examples 93-100, and wherein to securely package the collected telemetry data further comprises to timestamp the packaged telemetry data.

Example 102 includes the subject matter of any of Examples 93-101, and wherein to securely transmit the packaged telemetry data to the NFV SLA controller comprises to include an identifier of the SLA agent with the packaged telemetry data.

Example 103 includes a method for monitoring service level agreement (SLA) performance in an end-to-end SLA monitoring architecture, the method comprising securely receiving, by an SLA agent of the end-to-end SLA monitoring architecture, telemetry data monitoring instructions from a network functions virtualization (NFV) SLA controller, wherein the telemetry data monitoring instructions indicate telemetry data to be collected based on an SLA policy; securely collecting, by the SLA agent, the telemetry data based on the received telemetry data monitoring instructions; securely packaging, by the SLA agent, the collected telemetry data; and securely transmitting, by the SLA agent, the packaged telemetry data to the NFV SLA controller.

Example 104 includes the subject matter of Example 103, and wherein securely collecting the telemetry data comprises securely collecting at least one of a network packet behavior or information related to a network processing component on which the SLA agent has been initialized.

Example 105 includes the subject matter of any of Examples 103 and 104, and wherein securely collecting the network packet behavior comprises securely collecting at least one of a round-trip-time, jitter information, throughput information, latency information, or packet loss information.

Example 106 includes the subject matter of any of Examples 103-105, and wherein securely collecting the information related to the network processing component comprises securely collecting at least one of component-level configuration data, operation data of the network processing component, or utilization data of the network processing component.

Example 107 includes the subject matter of any of Examples 103-106, and wherein securely collecting the information related to the network processing component comprises securely collecting at least one of quality of service (QoS) metrics for memory, QoS metrics for cache, network interface controller queue utilization metrics, switch queue utilization metrics, or platform reliability metrics.

Example 108 includes the subject matter of any of Examples 103-107, and wherein securely receiving the telemetry data monitoring instructions from the NFV SLA controller comprises securely receiving the telemetry data monitoring instructions via a secure communication channel.

Example 109 includes the subject matter of any of Examples 103-108, and wherein securely transmitting the packaged telemetry data to the NFV SLA controller comprises securely transmitting the packaged telemetry data via a secure communication channel.

Example 110 includes the subject matter of any of Examples 103-109, and wherein securely collecting the telemetry data further comprises timestamping the collected telemetry data.

Example 111 includes the subject matter of any of Examples 103-110, and wherein securely packaging the collected telemetry data further comprises timestamping the packaged telemetry data.

Example 112 includes the subject matter of any of Examples 103-111, and wherein securely transmitting the packaged telemetry data to the NFV SLA controller comprises including an identifier of the SLA agent with the packaged telemetry data.

Example 113 includes a service level agreement (SLA) agent a processor; and a memory having stored therein a plurality of instructions that when executed by the processor cause the SLA agent to perform the method of any of Examples 103-112.

Example 114 includes one or more machine readable storage media comprising a plurality of instructions stored thereon that in response to being executed result in a service level agreement (SLA) agent performing the method of any of Examples 103-112.

Example 115 includes a service level agreement (SLA) agent for monitoring SLA performance in an end-to-end SLA monitoring architecture that includes the SLA agent, the SLA agent comprising means for securely receiving, by an SLA agent of the end-to-end SLA monitoring architecture, telemetry data monitoring instructions from a network functions virtualization (NFV) SLA controller, wherein the telemetry data monitoring instructions indicate telemetry data to be collected based on an SLA policy; means for securely collecting, by the SLA agent, the telemetry data based on the received telemetry data monitoring instructions; means for securely packaging, by the SLA agent, the collected telemetry data; and means for securely transmitting, by the SLA agent, the packaged telemetry data to the NFV SLA controller.

Example 116 includes the subject matter of Example 115, and wherein the means for securely collecting the telemetry data comprises means for securely collecting at least one of a network packet behavior or information related to a network processing component on which the SLA agent has been initialized.

Example 117 includes the subject matter of any of Examples 115 and 116, and wherein the means for securely collecting the network packet behavior comprises means for securely collecting at least one of a round-trip-time, jitter information, throughput information, latency information, or packet loss information.

Example 118 includes the subject matter of any of Examples 115-117, and wherein the means for securely collecting the information related to the network processing component comprises means for securely collecting at least one of component-level configuration data, operation data of the network processing component, or utilization data of the network processing component.

Example 119 includes the subject matter of any of Examples 115-118, and wherein the means for securely collecting the information related to the network processing component comprises means for securely collecting at least one of quality of service (QoS) metrics for memory, QoS metrics for cache, network interface controller queue utilization metrics, switch queue utilization metrics, or platform reliability metrics.

Example 120 includes the subject matter of any of Examples 115-119, and wherein the means for securely receiving the telemetry data monitoring instructions from the NFV SLA controller comprises means for securely receiving the telemetry data monitoring instructions via a secure communication channel.

Example 121 includes the subject matter of any of Examples 115-120, and wherein the means for securely transmitting the packaged telemetry data to the NFV SLA controller comprises means for securely transmitting the packaged telemetry data via a secure communication channel.

Example 122 includes the subject matter of any of Examples 115-121, and wherein the means for securely collecting the telemetry data further comprises means for timestamping the collected telemetry data.

Example 123 includes the subject matter of any of Examples 115-122, and wherein the means for securely packaging the collected telemetry data further comprises means for timestamping the packaged telemetry data.

Example 124 includes the subject matter of any of Examples 115-123, and wherein the means for securely transmitting the packaged telemetry data to the NFV SLA controller comprises means for including an identifier of the SLA agent with the packaged telemetry data.

The invention claimed is:

1. A network functions virtualization (NFV) service level agreement (SLA) controller for monitoring SLA performance in an end-to-end SLA monitoring architecture that includes the NFV SLA controller, the NFV SLA controller comprising:

one or more processors; and one or more memory devices having stored therein a plurality of instructions that, when executed by the one or more processors, cause the NFV SLA controller to:

manage an initialization of a plurality of SLA agents in a trusted execution environment of one or more network processing components of the end-to-end SLA monitoring architecture to securely collect and transmit telemetry data to the NFV SLA controller independent of each network processing component in which a corresponding one of the SLA agents has been initialized, wherein the one or more network processing components of the end-to-end SLA monitoring architecture in which the SLA agents are initialized is based on an SLA policy, wherein the SLA policy identifies one or more performance benchmarks, and wherein each of the one or more performance benchmarks indicate an expected quality of service level associated with processing network traffic through the end-to-end SLA monitoring architecture;

provide telemetry data monitoring instructions to each of the initialized SLA agents based on the one or more performance benchmarks, wherein the generated telemetry data monitoring instructions are usable to determine which types of telemetry data to monitor;

receive telemetry data from each of the initialized SLA agents based on the provided telemetry data monitoring instructions;

analyze, by an SLA analysis engine in a trusted execution environment of the NFV SLA controller, the received telemetry data;

determine, by the SLA analysis engine, one or more performance metrics based on the analysis, wherein the one or more determined performance metrics identify measurable characteristics of the received telemetry data;

compare one or more of the one or more performance benchmarks to a corresponding one or more of the determined performance metrics;

generate an SLA report that includes results of the comparison of the one or more of the one or more performance benchmarks and the determined performance metrics; and transmit the generated SLA report to a target receiving component of the end-to-end SLA monitoring architecture.

2. The NFV SLA controller of claim 1, wherein to initialize the plurality of SLA agents in the one or more network processing components of the end-to-end SLA monitoring architecture comprises to initialize one or more SLA agents in at least one of a computing node of the end-to-end SLA monitoring architecture, a virtual network function presently being executed on the computing node of the end-to-end SLA monitoring architecture, a virtual infrastructure manager of the end-to-end SLA monitoring architecture, or a TEE of an NFV infrastructure of the end-to-end SLA monitoring architecture.

3. The NFV SLA controller of claim 1, wherein to receive the telemetry data from each of the initialized SLA agents comprises to receive the telemetry data via a secure communication channel between the NFV SLA controller and each of the initialized SLA agents.

4. The NFV SLA controller of claim 1, wherein to provide the generated telemetry data monitoring instructions to each of the initialized SLA agents comprises to provide the generated telemetry data monitoring instructions via a secure communication channel between the NFV SLA controller and each of the initialized SLA agents.

5. The NFV SLA controller of claim 1, wherein the plurality of instructions further cause the NFV SLA controller to:

authenticate the received telemetry data to verify an authenticity of the received telemetry data; and store the authenticated received telemetry data in a secure database.

6. The NFV SLA controller of claim 5, wherein to authenticate the received telemetry data comprises to verify at least one of an origin of the telemetry data or a timestamp of the telemetry data.

7. The NFV SLA controller of claim 1, wherein to receive the telemetry data comprises to receive at least one of a round-trip-time, jitter information, throughput information, latency information, packet loss information, quality of service (QoS) metrics for memory, QoS metrics for cache, network interface controller queue utilization metrics, switch queue utilization metrics, platform reliability metrics, component-level configuration data, operation data of a network processing component of the end-to-end SLA monitoring architecture, or utilization data of the network processing component of the end-to-end SLA monitoring architecture.

8. The NFV SLA controller of claim 1, wherein to determine the one or more performance metrics comprises to determine at least one of a quality of service level, an application response time, a usage statistic, or a resource utilization metric.

9. The NFV SLA controller of claim 1, wherein to analyze the received telemetry data to determine the one or more performance metrics comprises to analyze the received telemetry data to determine the one or more performance metrics specific to one or more tenants of the end-to-end SLA monitoring architecture.

10. The NFV SLA controller of claim 1, wherein the plurality of instructions further cause the NFV SLA controller to at least one of sign the generated SLA report prior to transmission or timestamp the generated SLA report prior to transmission.

11. The NFV SLA controller of claim 1, wherein the plurality of instructions further cause the NFV SLA controller to:

monitor a health of each of the plurality of initialized SLA agents;

initiate, in response to a determination that the monitored health indicates that a present health of an SLA agent of the plurality of SLA agents may compromise a level of integrity of the network processing component on which the SLA agent has been initialized, a corrective action based on the present health.

12. One or more non-transitory, computer-readable storage media comprising a plurality of instructions stored thereon that in response to being executed cause a network functions virtualization (NFV) service level agreement (SLA) controller to:

manage an initialization of a plurality of SLA agents in a trusted execution environment of one or more network processing components of the end-to-end SLA monitoring architecture to securely collect and transmit telemetry data to the NFV SLA controller independent of each network processing component in which a corresponding one of the SLA agents has been initialized, wherein the one or more network processing components of the end-to-end SLA monitoring architecture in which the SLA agents are initialized is based on an SLA policy, wherein the SLA policy identifies one or more performance benchmarks, and wherein each of the one or more performance benchmarks indicate an expected quality of service level associated with processing network traffic through the end-to-end SLA monitoring architecture;

provide telemetry data monitoring instructions to each of the initialized SLA agents based on the one or more performance benchmarks, wherein the generated telemetry data monitoring instructions are usable to determine which types of telemetry data to monitor;

receive telemetry data from each of the initialized SLA agents based on the provided telemetry data monitoring instructions;

analyze, by an SLA analysis engine in a trusted execution environment of the NFV SLA controller, the received telemetry data;

determine one or more performance metrics based on the analysis, wherein the one or more determined performance metrics identify measurable characteristics of the received telemetry data;

compare one or more of the one or more performance benchmarks to a corresponding one or more of the determined performance metrics;

generate an SLA report that includes a result of the comparison of the one or more of the one or more performance benchmarks and the determined performance metrics; and transmit the generated SLA report to a target receiving component of the end-to-end SLA monitoring architecture.

13. The one or more non-transitory, computer-readable storage media of claim 12, wherein to initialize the plurality of SLA agents in the one or more network processing components of the end-to-end SLA monitoring architecture comprises to initialize one or more SLA agents in at least one of a computing node of the end-to-end SLA monitoring architecture, a virtual network function presently being executed on the computing node of the end-to-end SLA monitoring architecture, a virtual infrastructure manager of the end-to-end SLA monitoring architecture, or a TEE of an NFV infrastructure of the end-to-end SLA monitoring architecture.

14. The one or more non-transitory, computer-readable storage media of claim 12, wherein to receive the telemetry data from each of the initialized SLA agents comprises to receive the telemetry data via a secure communication channel between the NFV SLA controller and each of the initialized SLA agents.

15. The one or more non-transitory, computer-readable storage media of claim 12, wherein to provide the generated telemetry data monitoring instructions to each of the initialized SLA agents comprises to provide the generated telemetry data monitoring instructions via a secure communication channel between the NFV SLA controller and each of the initialized SLA agents.

16. The one or more non-transitory, computer-readable storage media of claim 12, wherein the plurality of instructions further cause the NFV SLA controller to:

authenticate the received telemetry data to verify an authenticity of the received telemetry data; and store the authenticated received telemetry data in a secure database.

17. The one or more non-transitory, computer-readable storage media of claim 16, wherein to authenticate the received telemetry data comprises to verify at least one of an origin of the telemetry data or a timestamp of the telemetry data.

18. The one or more non-transitory, computer-readable storage media of claim 12, wherein to receive the telemetry data comprises to receive at least one of a round-trip-time, jitter information, throughput information, latency information, packet loss information, quality of service (QoS) metrics for memory, QoS metrics for cache, network interface controller queue utilization metrics, switch queue utilization metrics, platform reliability metrics, component-level configuration data, operation data of a network processing component of the end-to-end SLA monitoring architecture, or utilization data of the network processing component of the end-to-end SLA monitoring architecture.

19. The one or more non-transitory, computer-readable storage media of claim 12, wherein the one or more performance metrics include at least one of a quality of service level, an application response time, a usage statistic, or a resource utilization metric.

20. The one or more non-transitory, computer-readable storage media of claim 12, wherein to analyze the received telemetry data to determine the one or more performance metrics comprises to analyze the received telemetry data to determine the one or more performance metrics specific to one or more tenants of the end-to-end SLA monitoring architecture.

21. The one or more non-transitory, computer-readable storage media of claim 12, wherein the plurality of instructions further cause the NFV SLA controller to at least one of sign the generated SLA report prior to transmission or timestamp the generated SLA report prior to transmission.

22. A network functions virtualization (NFV) service level agreement (SLA) controller for monitoring SLA performance in an end-to-end SLA monitoring architecture that includes the NFV SLA controller, the NFV SLA controller comprising:

means for managing an initialization of a plurality of SLA agents in a trusted execution environment of one or more network processing components of the end-to-end SLA monitoring architecture to securely collect and transmit telemetry data to the NFV SLA controller independent of each network processing component in which a corresponding one of the SLA agents has been initialized, wherein the one or more network processing components of the end-to-end SLA monitoring architecture in which the SLA agents are initialized is based on an SLA policy, wherein the SLA policy identifies one or more performance benchmarks, and wherein each of the one or more performance benchmarks indicate an expected quality of service level associated with processing network traffic through the end-to-end SLA monitoring architecture;

means for providing telemetry data monitoring instructions to each of the initialized SLA agents based on the one or more performance benchmarks, wherein the generated telemetry data monitoring instructions are usable to determine which types of telemetry data to monitor;

means for receiving telemetry data from each of the initialized SLA agents based on the provided telemetry data monitoring instructions;

means for analyzing, in a trusted execution environment of the NFV SLA controller, the received telemetry data;

means for determining one or more performance metrics based on the analysis, wherein the one or more determined performance metrics identify measurable characteristics of the received telemetry data;

means for comparing one or more of the one or more performance benchmarks to a corresponding one or more of the determined performance metrics; and an SLA report generation circuit to (i) generate an SLA report that includes results of the comparison of the one or more of the one or more performance benchmarks and the one or more performance metrics and (ii) transmit the generated SLA report to a target receiving component of the end-to-end SLA monitoring architecture.

23. The NFV SLA controller of claim 22, further comprising:

means for authenticating the received telemetry data to verify an authenticity of the received telemetry data; and means for storing the authenticated received telemetry data in a secure database.

24. The NFV SLA controller of claim 11, wherein to initiate the corrective action comprises to (i) terminate the SLA agent in the network processing component on which the SLA agent has been initialized and (ii) initialize a new SLA agent in the network processing component on which the SLA agent has been terminated.

25. The NFV SLA controller of claim 11, wherein to initiate the corrective action comprises to update the SLA monitoring policy.

* * * * *